US010574412B2

(12) United States Patent
Chung et al.

(10) Patent No.: US 10,574,412 B2
(45) Date of Patent: *Feb. 25, 2020

(54) CHANNEL-SOUNDING METHOD USING A PLURALITY OF ANTENNAS, AND APPARATUS FOR SAME

(71) Applicant: LG Electronics Inc., Seoul (KR)

(72) Inventors: Jae Hoon Chung, Anyang-si (KR); Yeong Hyeon Kwon, Anyang-si (KR); Seung Hee Han, Anyang-si (KR); Min Seok Noh, Anyang-si (KR)

(73) Assignee: LG Electronics Inc., Seoul (KR)

( * ) Notice: Subject to any disclaimer, the term of this patent is extended or adjusted under 35 U.S.C. 154(b) by 359 days.

This patent is subject to a terminal disclaimer.

(21) Appl. No.: 15/408,283

(22) Filed: Jan. 17, 2017

(65) Prior Publication Data

US 2017/0126382 A1    May 4, 2017

Related U.S. Application Data

(63) Continuation of application No. 14/986,282, filed on Jan. 6, 2016, now abandoned, which is a continuation
(Continued)

(51) Int. Cl.
*H04W 72/04*    (2009.01)
*H04W 76/27*    (2018.01)
(Continued)

(52) U.S. Cl.
CPC ......... *H04L 5/0048* (2013.01); *H04B 7/0684* (2013.01); *H04B 7/0693* (2013.01);
(Continued)

(58) Field of Classification Search
CPC ... H04B 7/0684; H04B 7/0693; H04L 1/0026; H04L 1/1671; H04L 5/0048;
(Continued)

(56) References Cited

U.S. PATENT DOCUMENTS 8,391,234 B2    3/2013    Nouda et al.
8,599,819 B2    12/2013    Kim et al.
(Continued)

FOREIGN PATENT DOCUMENTS

| CN | 101384055 | 3/2009 |
|---|---|---|
| KR | 1020080072503 | 8/2008 |
| KR | 10-2008-0088525 | 10/2008 |

OTHER PUBLICATIONS

LG Electronics, "Uplink MIMO Transmission for LTE-Advanced," 3GPP TSG RAN WG1 Meeting #55bis, R1-090217, Jan. 2009, 7 pages.
(Continued)

*Primary Examiner* — Asad M Nawaz
*Assistant Examiner* — Berhanu D Belete
(74) *Attorney, Agent, or Firm* — Lee Hong DeGerman Kang Waimey

(57) ABSTRACT

The present invention relates to a wireless communication system. More particularly, the present invention relates to a method and to an apparatus for transmitting an SRS in a multi-antenna system. The method comprises the steps of: acquiring specific information for discriminating a first antenna group and a second antenna group from among a plurality of antennas, wherein said first antenna group includes one or more antennas which are set to a turned-on state to perform communication with a base station, and said second antenna group includes one or more other antennas which are set to a turned-off state; transmitting an SRS to the base station if a predetermined condition is satisfied, under the condition that the second antenna group is set to the turned-off state; and setting the second antenna group to a turned-off state after the transmission of the SRS.

28 Claims, 17 Drawing Sheets

(a) When K (= A_srs/B_srs) is even (b) When K (= A_srs/B_srs) is odd

Related U.S. Application Data of application No. 13/258,428, filed as application No. PCT/KR2010/001753 on Mar. 22, 2010, now Pat. No. 9,270,356.

(60) Provisional application No. 61/187,285, filed on Jun. 16, 2009, provisional application No. 61/178,818, filed on May 15, 2009, provisional application No. 61/162,323, filed on Mar. 22, 2009.

(51) Int. Cl.
*H04L 5/00* (2006.01)
*H04B 7/06* (2006.01)
*H04L 1/00* (2006.01)
*H04L 1/16* (2006.01)

(52) U.S. Cl.
CPC ... *H04W 72/0406* (2013.01); *H04W 72/0446* (2013.01); *H04W 72/0453* (2013.01); *H04W 76/27* (2018.02); *H04L 1/0026* (2013.01); *H04L 1/1671* (2013.01)

(58) Field of Classification Search
CPC ......... H04W 72/0406; H04W 72/0446; H04W 72/0453; H04W 76/27
See application file for complete search history.

(56) References Cited

U.S. PATENT DOCUMENTS

| | | | |
|---|---|---|---|
| 8,837,393 B2* | 9/2014 | Han | H04B 7/0669 370/329 |
| 8,989,308 B2 | 3/2015 | Hooli et al. | |
| 9,577,805 B2 | 2/2017 | Chung et al. | |
| 2007/0171995 A1 | 7/2007 | Muharemovic et al. | |
| 2007/0253465 A1 | 11/2007 | Muharemovic et al. | |
| 2008/0075184 A1 | 3/2008 | Muharemovic et al. | |
| 2009/0028112 A1 | 1/2009 | Attar et al. | |
| 2009/0046570 A1 | 2/2009 | Sarkar et al. | |
| 2009/0046645 A1 | 2/2009 | Bertrand et al. | |
| 2009/0046800 A1 | 2/2009 | Xu et al. | |
| 2009/0054093 A1 | 2/2009 | Kim et al. | |
| 2009/0252260 A1 | 10/2009 | Noh et al. | |
| 2009/0268910 A1 | 10/2009 | Liu et al. | |
| 2009/0316756 A1 | 12/2009 | Ro et al. | |
| 2010/0040036 A1 | 2/2010 | Ofuji et al. | |
| 2010/0103902 A1* | 4/2010 | Kim | H04L 5/0048 370/330 |
| 2010/0167743 A1 | 7/2010 | Palanki et al. | |
| 2010/0272152 A1 | 10/2010 | Kishiyama et al. | |
| 2010/0296480 A1* | 11/2010 | Nouda | H04J 11/00 370/330 |
| 2010/0296591 A1 | 11/2010 | Xu et al. | |
| 2010/0309836 A1 | 12/2010 | Sugawara et al. | |
| 2011/0032888 A1 | 2/2011 | Matsumoto et al. | |
| 2011/0176480 A1 | 7/2011 | Dahlman et al. | |
| 2011/0228748 A1* | 9/2011 | Han | H04B 7/0669 370/335 |
| 2011/0261716 A1* | 10/2011 | Kim | H04B 7/0671 370/252 |
| 2011/0280220 A1 | 11/2011 | Jia et al. | |
| 2011/0299625 A1* | 12/2011 | Hooli | H04J 13/0074 375/295 |
| 2011/0310856 A1 | 12/2011 | Hariharan et al. | |
| 2012/0014349 A1 | 1/2012 | Chung et al. | |

OTHER PUBLICATIONS

LG Electronics, "UL sounding RS Operation," 3GPP TSG RAN WG1 #51bis, R1-080256, Jan. 2008, 6 pages.

The State Intellectual Property Office of the People's Republic of China Application Serial No. 201080013306.0, Office Action dated Aug. 19, 2013, 6 pages.

* cited by examiner (a) Control-Plane Protocol Stack (b) User-Plane Protocol Stack (a) When K (= A_srs/B_srs) is even (b) When K (= A_srs/B_srs) is odd ☐ SRS transmission using antenna #0

▨ SRS transmission using antenna #1

All (M) required SRSs are multiplexed in a determined
SRS transmission band <- CDM using M different cyclic
shifts (base sequence indices may also be used as code resources)

All (M) required SRSs are individually multiplexed in respective allocated SRS transmission bands All (M) required SRSs are individually multiplexed in
respective pairs of (a total of N) allocated SRS transmission
bands and (a total of P) cyclic shifts. N*P is equal to or greater than M.
Respective SRSs may be allocated in a code-first scheme or a band-first manner.

All (M) required SRSs are multiplexed in determined SRS
transmission band in two SRS transmission symbols
(for example, last symbol of each slot in the subframe)

All (M) required SRSs are multiplexed in determined SRS
transmission band in two SRS transmission symbols
(for example, last symbols of second slot in the subframe)

US 10,574,412 B2

CHANNEL-SOUNDING METHOD USING A PLURALITY OF ANTENNAS, AND APPARATUS FOR SAME

CROSS-REFERENCE TO RELATED APPLICATIONS

This application is a continuation of U.S. application Ser. No. 14/986,282, filed on Dec. 31, 2015, now U.S. Pat. No. 9,577,805, which is a continuation of U.S. application Ser. No. 13/258,428, filed Sep. 21, 2011, now U.S. Pat. No. 9,270,356, which is the National Stage filing under 35 U.S.C. 371 of International Application No. PCT/KR2010/001753, filed on Mar. 22, 2010, which claims the benefit of U.S. Provisional Application No. 61/187,285, filed on Jun. 16, 2009, 61/178,818, filed on May 15, 2009 and 61/162,323, filed on Mar. 22, 2009, the contents of which are all hereby incorporated by reference herein in their entirety.

TECHNICAL FIELD

The present invention relates to a wireless communication system.

Particularly, the present invention relates to a channel sounding method using a plurality of antennas and an apparatus for the same.

BACKGROUND ART

A 3rd Generation Partnership Project Long Term Evolution (3GPP LTE) communication system, which is an example of a mobile communication system to which the present invention may be applied, will now be described in brief.

FIG. 1 is a diagram schematically showing a network structure of an Evolved Universal Mobile Telecommunications System (E-UMTS) as an exemplary mobile communication system. The E-UMTS system has evolved from the conventional UMTS system and basic standardization thereof is currently underway in the 3GPP. The E-UMTS may be generally referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE) 120, eNBs (or eNode Bs or base stations) 110a and 110b, and an Access Gateway (AG) which is located at an end of a network (E-UTRAN) and connected to an external network. The eNBs may simultaneously transmit multiple data streams for a broadcast service, a multicast service, and/or a unicast service.

One or more cells may exist per eNB. A cell is set to use one of bandwidths of 1.25, 2.5, 5, 10, and 20 MHz to provide a downlink or uplink transport service to several UEs. Different cells may be set to provide different bandwidths. The eNB controls data transmission and reception for a plurality of UEs. The eNB transmits downlink scheduling information with respect to downlink data to notify a corresponding UE of a time/frequency domain in which data is to be transmitted, coding, data size, and Hybrid Automatic Repeat and reQuest (HARQ)-related information. In addition, the eNB transmits uplink scheduling information with respect to UL data to a corresponding UE to inform the UE of an available time/frequency domain, coding, data size, and HARQ-related information. An interface for transmitting user traffic or control traffic may be used between eNBs. A Core Network (CN) may include the AG, a network node for user registration of the UE, and the like. The AG manages mobility of a UE on a Tracking Area (TA) basis, wherein one TA includes a plurality of cells.

Although wireless communication technology has been developed up to LTE based on Wideband Code Division Multiple Access (WCDMA), the demands and expectations of users and providers continue to increase. In addition, since other wireless access technologies continue to be developed, new technology is required to secure competitiveness in the future. For example, decrease of cost per bit, increase of service availability, flexible use of a frequency band, simple structure, open interface, and suitable power consumption by a UE are required. Recently, standardization of a new technology subsequent to LTE (Release 8/9) is in progress in the 3GPP. In this specification, the technology is referred to as "LTE-Advanced" or "LTE-A" (Release 10 or beyond).

DISCLOSURE

Technical Problem

An object of the present invention devised to solve the problem lies in providing a channel sounding method using a plurality of antennas in a wireless communication system and an apparatus for the same.

Objects of the present invention are not limited to those described above and other objects will be clearly understood by those skilled in the art from the following description.

Technical Solution

In one aspect of the present invention, the object of the present invention can be achieved by providing a method for a User Equipment (UE) to transmit a Sounding Reference Signal (SRS) using a plurality of antennas in a wireless communication system, the method including acquiring specific information for discriminating between a first antenna group and a second antenna group among the plurality of antennas, the first antenna group including one or more antennas which are set in a turn-on state for communication with an eNode B and the second antenna group including one or more other antennas which are set in a turn-off state, transmitting an SRS to the eNode B through the second antenna group when a preset condition is satisfied with the second antenna group being set in a turn-off state, and setting the second antenna group in a turn-off state after transmitting the SRS.

In another aspect of the present invention, provided herein is a User Equipment (UE) including a plurality of antennas, a Radio Frequency (RF) unit configured to transmit and receive a wireless signal to and from an eNode B through the plurality of antennas, a memory for storing information transmitted and received to and from the eNode B and a parameter required for operation of the UE, and a processor connected to the RF unit and the memory, the processor being configured to control the RF unit and the memory, the processor being configured to perform a Sounding Reference Signal (SRS) transmission method including acquiring specific information for discriminating between a first antenna group and a second antenna group among the plurality of antennas, the first antenna group including one or more antennas which are set in a turn-on state for communication with the eNode B and the second antenna group including one or more other antennas which are set in a turn-off state, transmitting an SRS to the eNode B through the second antenna group when a preset condition is satisfied with the second antenna group being set in a turn-off state, and setting the second antenna group in a turn-off state after transmitting the SRS.

Here, the second antenna group may include antennas in which an Antenna Gain Imbalance (AGI) has occurred.

Here, whether or not the specific condition may be satisfied is determined based on whether or not a first duration for transmitting the SRS has elapsed and the first duration may be set to be longer than a second duration for SRS transmission through the first antenna group. In this case, the first duration may be set as a multiple of the second duration.

Here, an SRS may be transmitted to the eNode B through all antennas provided for the UE when the preset condition is satisfied.

Here, whether or not the specific condition is satisfied may be determined based on whether or not an SRS request for the second antenna group has been received from the eNode B. In this case, the SRS request for the second antenna group may be performed through L1/L2 control signaling.

Advantageous Effects

According to the embodiments of the present invention, it is possible to efficiently perform channel sounding using a plurality of antennas in a wireless communication system.

Advantages of the present invention are not limited to those described above and other advantages will be clearly understood by those skilled in the art from the following description.

DESCRIPTION OF DRAWINGS

The accompanying drawings, which are included to provide a further understanding of the invention and are incorporated in and constitute a part of this application, illustrate embodiments of the invention and together with the description serve to explain the principle of the invention.

In the drawings.

BEST MODE

The above and other configurations, operations, and features of the present invention will be easily understood from embodiments of the present invention, which are described below with reference to the accompanying drawings. The embodiments described below are examples in which the features of the present invention are applied to a 3GPP system.

Figure 1:
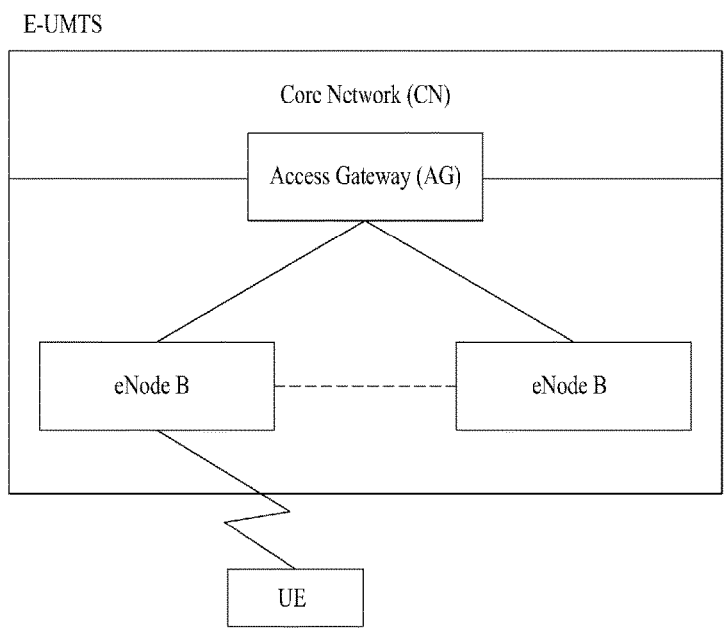
FIG. 1 illustrates a network structure of an E-UMTS as an exemplary mobile communication system.
Figure 2:
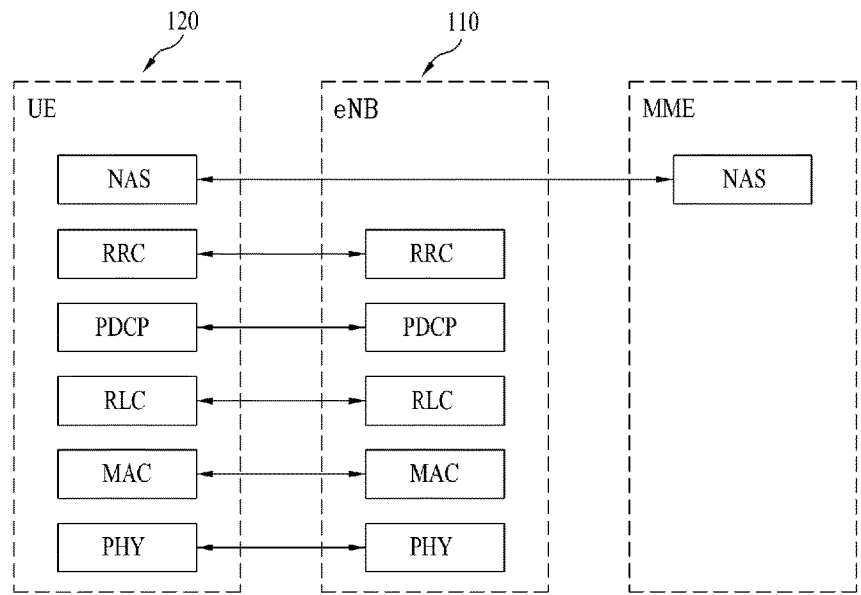
FIG. 2 illustrates structures of a control plane and a user plane of a radio interface protocol between a UE and E-UTRAN based on the 3GPP radio access network standard.
Figure 2:
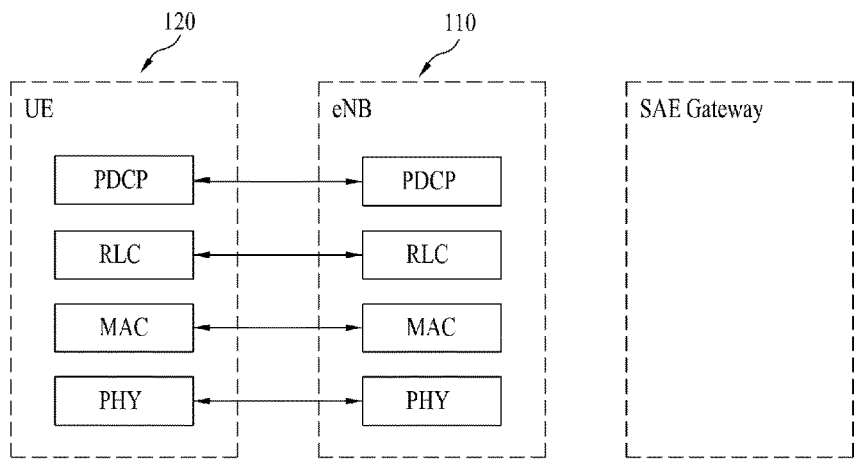

FIG. 2 is a diagram showing structures of a control plane and a user plane of a radio interface protocol between a UE and E-UTRAN based on the 3GPP radio access network standard. The control plane refers to a path used for transmitting control messages which are used in the UE and the network to manage a call. The user plane refers to a path used for transmitting data generated in an application layer, e.g., voice data or Internet packet data.

A physical (PHY) layer of a first layer provides an information transfer service to an upper layer using a physical channel. The PHY layer is connected to a Medium Access Control (MAC) layer of an upper layer via a transport channel. Data is transported between the MAC layer and the PHY layer via the transport channel. Data is also transported between a physical layer of a transmitting side and a physical layer of a receiving side via a physical channel. The physical channel uses time and frequency as radio resources. Specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A Medium Access Control (MAC) layer of a second layer provides a service to a Radio Link Control (RLC) layer of an upper layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as IPv4 or IPv6 in a radio interface having a relatively narrow bandwidth.

A Radio Resource Control (RRC) layer located at the bottommost portion of a third layer is defined only in the control plane. The RRC layer controls logical channels, transport channels, and physical channels in relation to configuration, re-configuration, and release of radio bearers. The radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located at an upper level of the RRC layer performs functions such as session management and mobility management.

One cell of the eNB is set to use one of bandwidths such as 1.25, 2.5, 5, 10, 15, and 20 MHz to provide a downlink or uplink transmission service to UEs. Different cells may be set to provide different bandwidths.

Downlink transport channels for data transmission from the network to the UE include a Broadcast Channel (BCH) for transmitting system information, a Paging Channel (PCH) for transmitting paging messages, and a downlink Shared Channel (SCH) for transmitting user traffic or control messages. User traffic or control messages of a downlink multicast or broadcast service may be transmitted through the downlink SCH or may be transmitted through an additional downlink Multicast Channel (MCH). Meanwhile, uplink transport channels for data transmission from the UE to the network include a Random Access Channel (RACH) for transmitting initial control messages and an uplink SCH for transmitting user traffic or control messages. Logical channels, which are located at an upper level of the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 3:
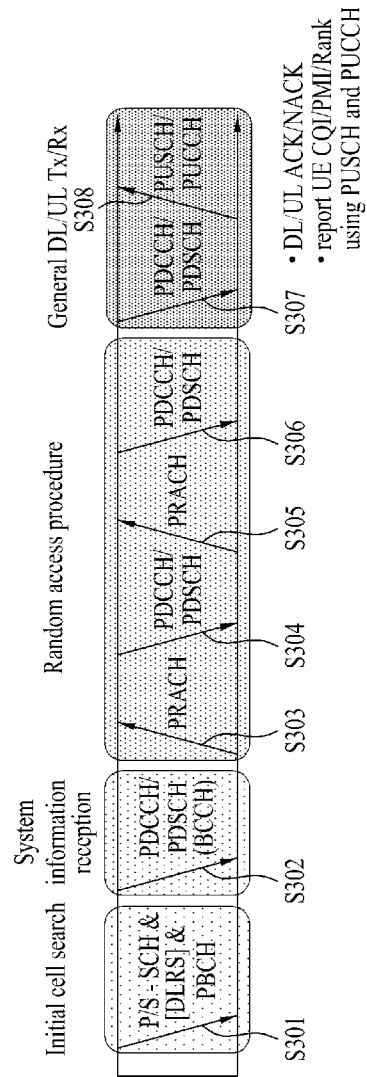
FIG. 3 illustrates physical channels used in a 3GPP system and a general signal transmission method using the same.

FIG. 3 is a diagram showing physical channels used in a 3GPP system and a general signal transmission method using the same.

A UE performs an initial cell search operation such as establishment of synchronization with an eNB when power is turned on or the UE enters a new cell (S301). The UE may receive a Primary Synchronization Channel (P-SCH) and a Secondary Synchronization Channel (S-SCH) from the eNB, establish synchronization with the eNB, and acquire information such as a cell identity (ID). Thereafter, the UE may receive a physical broadcast channel from the eNB to acquire broadcast information within the cell. Meanwhile, the UE may receive a Downlink Reference Signal (DL RS) in the initial cell search step to confirm a downlink channel state.

Upon completion of the initial cell search, the UE may receive a Physical Downlink Control Channel (PDCCH) and a Physical Downlink Shared Channel (PDSCH) according to information included in the PDCCH to acquire more detailed system information (S302).

Meanwhile, if the UE initially accesses the eNB or if radio resources for signal transmission are not present, the UE may perform a random access procedure (steps S303 to S306) with respect to the eNB. To this end, the UE may transmit a specific sequence through a Physical Random Access Channel (PRACH) as a preamble (steps S303 and S305), and receive a response message to the preamble through the PDCCH and the PDSCH corresponding thereto (steps S304 and S306). In the case of a contention-based RACH, a contention resolution procedure may be additionally performed.

The UE which performs the above procedures may receive a PDCCH/PDSCH (S307) and transmit a Physical Uplink Shared Channel (PUSCH)/Physical Uplink Control Channel (PUCCH) (S308) according to a general uplink/downlink signal transmission procedure. Control information transmitted by the UE to the eNB through uplink or received by the UE from the eNB through downlink includes a downlink/uplink Acknowledgement/Negative Acknowledgement (ACK/NACK) signal, a Channel Quality Indicator (CQI), a Precoding Matrix Index (PMI), a Rank Indicator (RI), and the like. In the case of the 3GPP LTE system, the UE may transmit the control information such as CQI/PMI/RI through the PUSCH and/or the PUCCH.

Figure 4:
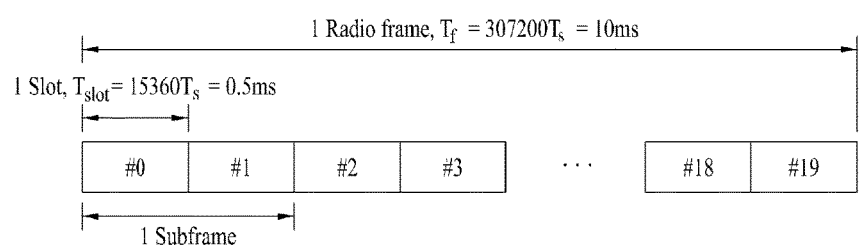
FIG. 4 illustrates the structure of a radio frame used in an LTE system.

FIG. 4 is a diagram showing the structure of a radio frame used in an LTE system.

Referring to FIG. 4, the radio frame has a length of 10 ms (327200 $T_s$) and includes 10 subframes each having the same size. Each of the subframes has a length of 1 ms and includes two slots. Each of the slots has a length of 0.5 ms (15360 $T_s$). In this case, $T_s$ denotes a sampling time, and is represented by $T_s=1/(15\ kHz\times2048)=3.2552\times10^{-8}$ (about 33 ns). Each slot includes a plurality of OFDM symbols in a time domain and includes a plurality of Resource Blocks (RBs) in a frequency domain. In the LTE system, one RB includes 12 subcarriers×7 (or 6) OFDM symbols. A Transmission Time Interval (TTI) which is a unit time for data transmission may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
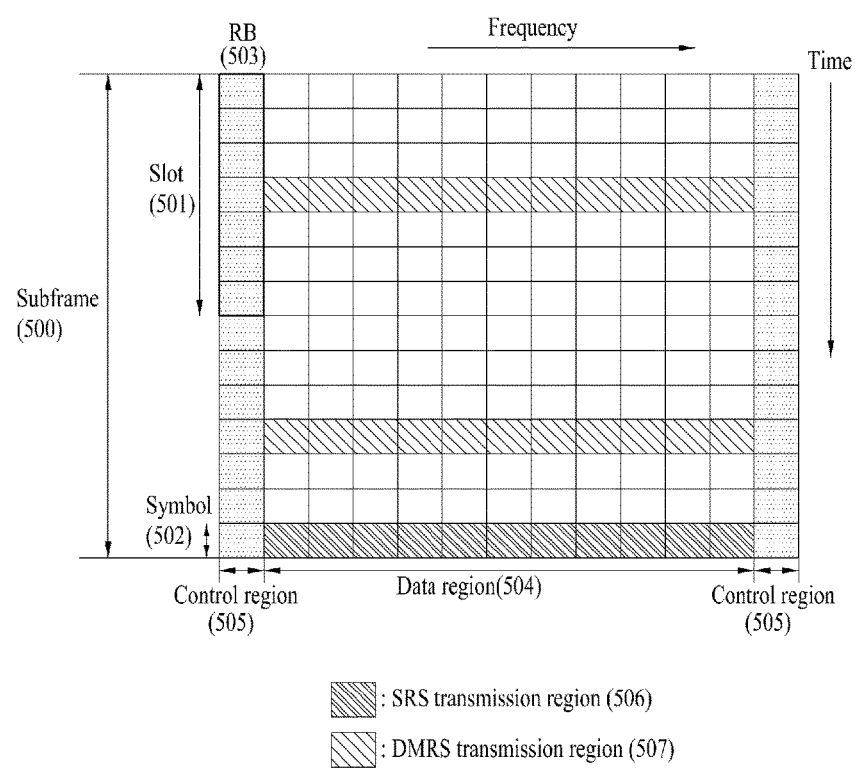
FIG. 5 illustrates the structure of an uplink subframe used in an LTE system.

FIG. 5 is a diagram illustrating the structure of an uplink subframe used in an LTE system.

As shown in FIG. 5, a 1 ms subframe 500, which is a basic unit of uplink transmission of LTE, includes two 0.5 ms slots 501. Assuming that it has a normal Cyclic Prefix (CP) length, each slot includes 7 symbols 502 and one symbol corresponds to one SC-FDMA symbol. A resource block 503 is a resource allocation unit which corresponds to 12 subcarriers in the frequency domain and corresponds to one slot in the time domain. A structure of an uplink subframe of LTE is mainly divided into a data area 504 and a control area 505. Here, the data area is a series of communication resources that are used to transmit data such as audio or a packet to each UE and corresponds resources other than the control area in the subframe. The control area is a series of communication resources that are used to transmit a downlink channel quality report, an ACK/NACK to a downlink signal, an uplink scheduling request, or the like from each UE.

As shown in the example of FIG. 5, a Sounding Reference Signal (SRS) is transmitted in an interval within a subframe in which the last SC-FDMA symbol in the subframe is located in the time domain and is transmitted through a data transmission band in the frequency domain. SRSs of a number of UEs that are transmitted through the last SC-FDMA symbol of the same subframe can be discriminated from each other according to the frequency location/sequence. SRS generation, physical resource mapping, multiplexing methods, resource allocation, and the like are described below in detail with reference to the 3GPP LTE (Release 8).

An SRS is constructed of a Constant Amplitude Zero Auto Correlation (CAZAC) sequence. SRSs transmitted from a number of UEs are CAZAC sequences ($r^{SRS}(n) = r_{u,v}^{(\alpha)}(n)$) having different cyclic shift values ($\alpha$) according to the following Expression 1.

$$\alpha = 2\pi \frac{n_{SRS}^{cs}}{8}$$ [Expression 1]

Here, $n_{SRS}^{cs}$ is a value set for each UE by the higher layer and has an integer value between 0 and 7.

Each CAZAC sequence generated from one CAZAC sequence through cyclic shifting has a zero correlation with other CAZAC sequences having cyclic shift values different from its cyclic shift value. Using these characteristics, SRSs of the same frequency region can be discriminated according to the sequence CAZAC sequence cyclic shift values. An SRS of each UE is allocated to a frequency according to a parameter that is set by the eNode B. The UE performs frequency hopping of the SRS to allow the SRS to be transmitted over the overall uplink data transfer bandwidth.

A detailed method for mapping physical resources for transmitting an SRS in an LTE system is described below.

First, each SRS sequence $r^{SRS}(n)$ is multiplied by $\beta_{SRS}$ in order to satisfy transmission power $P^{SRS}$ and then the SRS sequences, starting from an SRS sequence $r^{SRS}(0)$, are sequentially mapped to Resource Elements (REs) whose index is (k, l) according to the following Expression 2.

$$a_{2k+k_0, l} = \begin{cases} \beta_{SRS} r^{SRS}(k) & k = 0, 1, \ldots, M_{sc,b}^{RS} - 1 \\ 0 & \text{otherwise} \end{cases}$$ [Expression 2]

Here, $k_0$ indicates a frequency region start point of the SRS and $M_{sc,b}^{RS}$ is the length (i.e., bandwidth) of an SRS sequence represented in units of subcarriers as defined in the following Expression 3.

$$M_{sc,b}^{RS} = m_{SRS,b} N_{sc}^{RB}/2$$ [Expression 3]

In Expression 3, $m_{SRS,b}$ is a value signaled from an eNode B according to an uplink bandwidth $N_{RB}^{UL}$ as shown in the following Tables 1 to 4.

A cell specific parameter $C_{SRS}$ which is an integer value between 0 and 7 and a UE specific parameter $B_{SRS}$ which is an integer value between 0 and 3 are required to acquire $m_{SRS,b}$. The values of $C_{SRS}$ and $B_{SRS}$ are given by the higher layer.

TABLE 1

$b_{hop} = 0, 1, 2, 3$, values for the uplink bandwidth of $6 \leq N_{RB}^{UL} \leq 40$.

| SRS bandwidth configuration | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| $C_{SRS}$ | $m_{SRS,b}$ | $N_b$ | $m_{SRS,b}$ | $N_b$ | $m_{SRS,b}$ | $N_b$ | $m_{SRS,b}$ | $N_b$ |
| 0 | 36 | 1 | 12 | 3 | 4 | 3 | 4 | 1 |
| 1 | 32 | 1 | 16 | 2 | 8 | 2 | 4 | 2 |
| 2 | 24 | 1 | 4 | 6 | 4 | 1 | 4 | 1 |
| 3 | 20 | 1 | 4 | 5 | 4 | 1 | 4 | 1 |
| 4 | 16 | 1 | 4 | 4 | 4 | 1 | 4 | 1 |
| 5 | 12 | 1 | 4 | 3 | 4 | 1 | 4 | 1 |
| 6 | 8 | 1 | 4 | 2 | 4 | 1 | 4 | 1 |
| 7 | 4 | 1 | 4 | 1 | 4 | 1 | 4 | 1 |

TABLE 2

$b_{hop} = 0, 1, 2, 3$, values for the uplink bandwidth of $40 < N_{RB}^{UL} \leq 60$.

| SRS bandwidth configuration | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 48 | 1 | 24 | 2 | 12 | 2 | 4 | 3 |
| 1 | 48 | 1 | 16 | 3 | 8 | 2 | 4 | 2 |
| 2 | 40 | 1 | 20 | 2 | 4 | 5 | 4 | 1 |
| 3 | 36 | 1 | 12 | 3 | 4 | 3 | 4 | 1 |
| 4 | 32 | 1 | 16 | 2 | 8 | 2 | 4 | 2 |
| 5 | 24 | 1 | 4 | 6 | 4 | 1 | 4 | 1 |
| 6 | 20 | 1 | 4 | 5 | 4 | 1 | 4 | 1 |
| 7 | 16 | 1 | 4 | 4 | 4 | 1 | 4 | 1 |

TABLE 3

$b_{hop} = 0, 1, 2, 3$, values for the uplink bandwidth of $60 < N_{RB}^{UL} \leq 80$.

| SRS bandwidth configuration | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 72 | 1 | 24 | 3 | 12 | 2 | 4 | 3 |
| 1 | 64 | 1 | 32 | 2 | 16 | 2 | 4 | 4 |
| 2 | 60 | 1 | 20 | 3 | 4 | 5 | 4 | 1 |
| 3 | 48 | 1 | 24 | 2 | 12 | 2 | 4 | 3 |
| 4 | 48 | 1 | 16 | 3 | 8 | 2 | 4 | 2 |
| 5 | 40 | 1 | 20 | 2 | 4 | 5 | 4 | 1 |
| 6 | 36 | 1 | 12 | 3 | 4 | 3 | 4 | 1 |
| 7 | 32 | 1 | 16 | 2 | 8 | 2 | 4 | 2 |

TABLE 4

$b_{hop} = 0, 1, 2, 3$, values for the uplink bandwidth of $80 < N_{RB}^{UL} \leq 110$.

| SRS bandwidth configuration | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 96 | 1 | 48 | 2 | 24 | 2 | 4 | 6 |
| 1 | 96 | 1 | 32 | 3 | 16 | 2 | 4 | 4 |
| 2 | 80 | 1 | 40 | 2 | 20 | 2 | 4 | 5 |

TABLE 4-continued $b_{hop} = 0, 1, 2, 3,$ values for the uplink bandwidth of $80 < N_{RB}^{UL} \leq 110.$

| SRS bandwidth configuration | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 3 | 72 | 1 | 24 | 3 | 12 | 2 | 4 | 3 |
| 4 | 64 | 1 | 32 | 2 | 16 | 2 | 4 | 4 |
| 5 | 60 | 1 | 20 | 3 | 4 | 5 | 4 | 1 |
| 6 | 48 | 1 | 24 | 2 | 12 | 2 | 4 | 3 |
| 7 | 48 | 1 | 16 | 3 | 8 | 2 | 4 | 2 |

As described above, the UE may perform frequency hopping of the SRS to allow the SRS to be transmitted over the overall uplink data transfer bandwidth. This frequency hopping is set by a parameter $b_{hop}$ having a value of 0 to 3 that is given by the higher layer.

When the frequency hopping of the SRS is disabled (i.e., when $b_{hop} \geq B_{SRS}$), the frequency position index $n_b$ has a specific value as shown in the following Expression 4. In Expression 4, $n_{RRC}$ is a parameter given by the higher layer.

$$n_b = \lfloor 4n_{RRC}/m_{SRS,b} \rfloor \bmod N_b \quad \text{[Expression 4]}$$

On the other hand, when the frequency hopping of the SRS is enabled (i.e., when $b_{hop} < B_{SRS}$), the frequency position index $n_b$ is defined according to the following Expressions 5 and 6. In Expression 4, $n_{RRC}$ is a parameter given by the higher layer.

$$n_b = \begin{cases} \lfloor 4n_{RRC}/m_{SRS,b} \rfloor \bmod N_b & b \leq b_{hop} \\ \{F_b(n_{SRS}) + \lfloor 4n_{RRC}/m_{SRS,b} \rfloor\} \bmod N_b & \text{otherwise} \end{cases} \quad \text{[Expression 5]}$$

$$F_b(n_{SRS}) = \begin{cases} (N_b/2) \left\lfloor \dfrac{n_{SRS} \bmod \prod_{b'=b_{hop}}^{b} N_{b'}}{\prod_{b'=b_{hop}}^{b-1} N_{b'}} \right\rfloor + \\ \left\lfloor \dfrac{n_{SRS} \bmod \prod_{b'=b_{hop}}^{b} N_{b'}}{2\prod_{b'=b_{hop}}^{b-1} N_{b'}} \right\rfloor & \text{if } N_b \text{ even} \\ \lfloor N_b/2 \rfloor \left\lfloor n_{SRS} / \prod_{b'=b_{hop}}^{b-1} N_{b'} \right\rfloor & \text{if } N_b \text{ odd} \end{cases} \quad \text{[Expression 6]}$$

Here, $n_{SRS}$ is a parameter for calculating the number of times an SRS has been transmitted as is defined in the following Expression 7.

$$n_{SRS} = \begin{cases} 2N_{SP}n_f + 2(N_{SP}-1)\left\lfloor\dfrac{n_s}{10}\right\rfloor + \left\lfloor\dfrac{T_{offset}}{T_{offset\_max}}\right\rfloor, & \text{for 2ms SRS periodicity of TDD frame structure} \\ \lfloor (n_f \times 10 + \lfloor n_s/2 \rfloor)/T_{SRS} \rfloor, & \text{otherwise} \end{cases} \quad \text{[Expression 7]}$$

Here, $T_{SRS}$ denotes a period of the SRS and $T_{offset}$ denotes a subframe offset of the SRS. In addition, $n_s$ denotes a slot number and $n_f$ denotes a frame number.

UE specific SRS setting indices $I_{SRS}$ for setting the period $T_{SRS}$ and the subframe offset $T_{offset}$ of the SRS are shown in the following Tables 5 and 6 respectively for FDD and TDD.

TABLE 5

UE Specific SRS Periodicity $T_{SRS}$ and Subframe Offset Configuration $T_{offset}$, FDD.

| SRS Configuration Index $I_{SRS}$ | SRS Periodicity $T_{SRS}$ (ms) | SRS Subframe Offset $T_{offset}$ |
|---|---|---|
| 0-1 | 2 | $I_{SRS}$ |
| 2-6 | 5 | $I_{SRS} - 2$ |
| 7-16 | 10 | $I_{SRS} - 7$ |
| 17-36 | 20 | $I_{SRS} - 17$ |
| 37-76 | 40 | $I_{SRS} - 37$ |
| 77-156 | 80 | $I_{SRS} - 77$ |
| 157-316 | 160 | $I_{SRS} - 157$ |
| 317-636 | 320 | $I_{SRS} - 317$ |
| 637-1023 | reserved | reserved |

TABLE 6

UE Specific SRS Periodicity $T_{SRS}$ and Subframe Offset Configuration $T_{offset}$, TDD.

| Configuration Index $I_{SRS}$ | SRS Periodicity $T_{SRS}$ (ms) | SRS Subframe Offset $T_{offset}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS} - 10$ |
| 15-24 | 10 | $I_{SRS} - 15$ |
| 25-44 | 20 | $I_{SRS} - 25$ |
| 45-84 | 40 | $I_{SRS} - 45$ |
| 85-164 | 80 | $I_{SRS} - 85$ |
| 165-324 | 160 | $I_{SRS} - 165$ |
| 325-644 | 320 | $I_{SRS} - 325$ |
| 645-1023 | reserved | reserved |

TABLE 7

$k_{SRS}$, TDD

| | subframe index n | | | | | | | | | | |
|---|---|---|---|---|---|---|---|---|---|---|---|
| | | 1 | | | | | | 6 | | | | |
| | | 1st symbol | 2nd symbol | | | | | 1st symbol | 2nd symbol of | | | |
| | 0 | of UpPTS | of UpPTS | 2 | 3 | 4 | 5 | of UpPTS | UpPTS | 7 | 8 | 9 |
| $k_{SRS}$ in case UpPTS length of 2 symbols | 0 | 1 | | 2 | 3 | 4 | | 5 | 6 | 7 | 8 | 9 |
| $k_{SRS}$ in case UpPTS length of 1 symbol | | 1 | | 2 | 3 | 4 | | 6 | | 7 | 8 | 9 |

Figure 6:
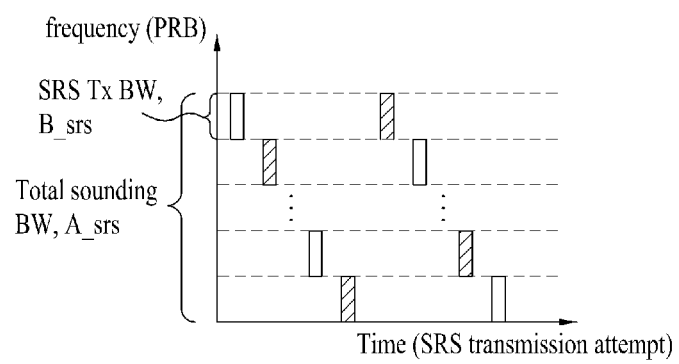
FIG. 6 illustrates a procedure for performing channel sounding in the case where closed-loop antenna selection is applied in an LTE system.
Figure 6:
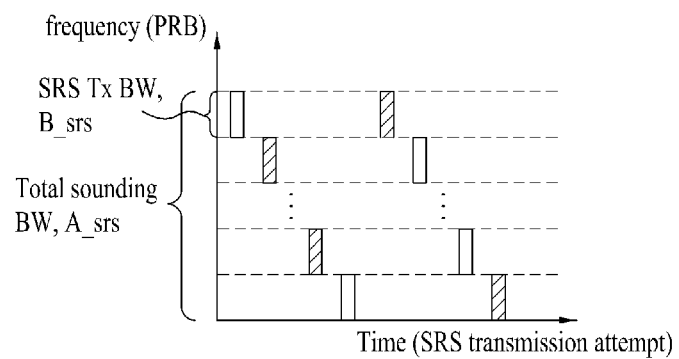

FIG. 6 illustrates a method for transmitting an SRS for each antenna when antenna selection is applied in an LTE system. In a conventional LTE system, a UE applies an open-loop antenna selection or closed-loop antenna selection scheme to switch single power amplifier output or single antenna transmission based on single RF power amplifier chain for a plurality of physical antennas (for example, 2 physical antennas) in the time resource region when performing uplink transmission.

Specifically, FIG. 6 illustrates an example in which an SRS is transmitted using a closed-loop selection transmission method. More specifically, FIG. 6 illustrates an example in which a frequency resource region is allocated to an SRS for each antenna at the timing of SRS transmission in the case where an SRS band smaller than the entire system band is applied and SRS hopping is applied. In the case where SRS hopping is not applied, an SRS is transmitted alternately using each individual antenna at the position of transmission and the same SRS band for each individual SRS transmission time. Unlike this method, an uplink transmission entity (i.e., a UE or a relay node) such as an LTE-A UE can perform uplink transmission to a plurality of antennas while having a plurality of transmission antennas and a plurality of RF power amplifier chains. If it is assumed in this situation that the method of transmitting an SRS for each individual antenna described above is applied as an SRS transmission method, there is a problem in that it is necessary to turn off a power amplifier of an antenna which does not transmit an SRS in one or more SRS transmission symbols (for example, OFDM symbols or SC-FDMA symbols) in a subframe in an LTE-A system to which a simultaneously transmission scheme which uses a plurality of RF power amplifier chains and a plurality of antennas is applied. In addition, there may also be a problem in that the transmission power of an antenna for transmitting an SRS is limited to 1/(the number of transmission antennas) relative to single antenna transmission power. In the case of LTE, an arbitrary UE uses, for SRS transmission, the last symbol of a subframe at the time of SRS transmission. In the LTE-A system, a plurality of symbols may be used for SRS transmission and the positions of the symbols in a subframe may be different from those in the case of the LTE system although the same number and/or positions of SRS transmission symbols as those of the LTE system may also be applied to the LTE-A system. In addition, a method of configuring SRS transmission and other uplink channel transmission in an LTE-A uplink transmission scheme which allows non-contiguous RB transmission and corresponding PUSCH/PUCCH and PUCCH/PUCCH decoupling (or simultaneous transmission of different channels) may also be applied in a different manner from that of the LTE system. In consideration of these facts, a method of transmitting an SRS of each individual antenna, which is different from the conventional SRS transmission method, may be defined in the LTE-A system.

The present invention suggests a method of transmitting an SRS for the purpose of channel sounding for performing status information related measurement of channel(s) configured for uplink transmission in a situation in which an uplink transmission entity (i.e., a UE or a relay node) in the LTE-A system can perform uplink transmission to a plurality of antennas while having a plurality of transmission antennas and a plurality of RF power amplifier chains. Suggestions of the present invention can be applied to any mobile communication system in which uplink transmission is simultaneously performed through each individual antenna through a plurality of RF power/signal amplifiers and a plurality of transmission antennas although the present invention has been described with reference to an LTE-A system throughout this specification.

Embodiment 1

Method of multiplexing individual SRSs that are generated in units of transmission antennas (when precoding is not applied to SRS) or in units of transmission layers (when precoding is applied to SRS) in a multi-antenna situation {Technology Associated with Allocation of Parts Associated with SRS Resource Allocation in LTE}

The following is a summary of information items that are associated with SRS transmission resource allocation to an arbitrary UE in the conventional technology described above —Transmission Comb $k_{TC}$ $k_{TC}$ is a parameter used to derive a frequency region start point of an SRS. One of 0 and 1 is used as an offset value associated with "transmission comb". This parameter is defined as a UE-specific RRC parameter and is indicated through UE-specific RRC signaling. The definition of $k_{TC}$ is described in section 5.5.3.2 of the 3GPP Technical Specification (TS) 36.211.

—Starting Physical Resource Block Allocation $n_{RRC}$ $n_{RRC}$ is a UE-specific RRC parameter indicating the frequency domain position of an SRS and is indicated through UE-specific RRC signaling. The definition of $n_{RRC}$ is described in section 5.5.3.2 of the 3GPP TS 36.211.

—SRS Transmission Duration: Single or Indefinite (Until Impossible)

This information is defined as a UE-specific RRC parameter and is transmitted through UE-specific RRS signaling. In the case where this parameter is set to "single", an SRS is transmitted only once and, in the case where this parameter is set to "indefinite", an SRS continues to be transmitted according to the set configuration unless in a SRS transmission disabled situation or unless corresponding signaling is received.

—SRS Configuration Index $I_{SRS}$ for SRS Periodicity and SRS Subframe Offset $T_{offset}$ These information items are defined as UE-specific RRC parameters and are transmitted through UE-specific RRC signaling. Specifically, these parameters are information indicating the transmission period of an SRS and an arbitrary subframe offset. These information items are configured for TDD as shown in Table 5 and are configured for FDD as shown in Table 6. These parameters are described in section 8.2 of the 3GPP TS 36.211.

—SRS Bandwidth $B_{SRS}$

This information is defined as a UE-specific RRC parameter and is transmitted through UE-specific RRS signaling. As index information used to define an SRS bandwidth, this parameter is specified as one of 0, 1, 2, and 3. This parameter is used for physical resource mapping as described in section 5.5.3.2 of the 3GPP Technical Specification (TS) 36.211 in the conventional technology described above.

—Frequency Hopping Bandwidth $b_{hop}$

This information is defined as a UE-specific RRC parameter and is transmitted through UE-specific RRS signaling. As index information used to configure frequency hopping of an SRS, this parameter is specified as one of 0, 1, 2, and 3. This parameter is used for physical resource mapping as described in section 5.5.3.2 of the 3GPP Technical Specification (TS) 36.211 in the conventional technology described above.

—Cyclic Shift $n_{SRS}^{cs}$

This parameter is defined as a UE-specific RRC parameter and is transmitted through UE-specific RRS signaling. As index information of cyclic shift of a sequence used to generate an SRS sequence, this cyclic shift parameter is used as orthogonal resources in code multiplexing of SRSs for a number of UEs. This parameter is used to generate an SRS code sequence as described in section 5.5.3.2 of the 3GPP Technical Specification (TS) 36.211 in the conventional technology described above.

—Base Sequence Index

This information characterizes an SRS sequence together with the cyclic shift when generating an SRS sequence. This information is derived from a base sequence index of a PUCCH.

In the LTE system, physical resource mapping and resource allocation for SRSs of individual UEs are performed based on the parameters described above. The most important thing, which should be taken into consideration when designing physical resource mapping and resource allocation for uplink SRS transmission in the LTE-A system, is that the LTE-A UE performs uplink transmission using a plurality of transmission antennas at an arbitrary time using RF chains and a plurality of power amplifiers while the LTE UE performs uplink transmission through a single transmission antenna at an arbitrary time using a single power amplifier. The following are a summary of important design considerations in main suggestions of the present invention, focusing upon this fact.

Compared to a conventional LTE UE, an arbitrary LTE-A UE is likely to increase the frequency of attempts to perform SRS transmission for channel sounding for all (physical) antennas of the UE over a full system band. Therefore, delay may occur in association with full band channel sounding for all uplink (physical) antennas and a different delay condition may be applied when SRS transmission of each layer or each individual antenna is applied. This may impose limitation to acquisition of optimal throughput gain when Doppler frequencies are present in association with channel-dependent scheduling of an eNode B.

In the case where the LTE-A inherits an LTE scheme in which SRS transmission symbols are defined according to a TDM scheme in which an SRS is transmitted in a partial time region of an arbitrary subframe for the purpose of channel sounding, symbols carrying a PUSCH or a PUCCH and a symbol(s) carrying an SRS may be discriminated from each other in a subframe. In this situation, an SRS may be transmitted using a different number of antennas from the number of transmission antennas through which a PUSCH or a PUCCH is transmitted. In this case, a power pooling situation in which power of a series of transmission antennas which are turned off is distributed to a transmission antenna(s) that is turned on may occur when it is possible to turn some transmission antennas on or off at boundaries between PUSCH/PUCCH transmission symbols and SRS transmission symbols. It takes time to perform such on/off switching of power and/or signal amplifiers. To cope with this situation, it is possible to define a series of guard times using a series of time sample regions at the last time sample interval of symbols prior to symbol (e.g., OFDM or SC-FDMA symbol) boundaries between an SRS transmission symbol(s) and PUSCH or PUCCH transmission symbols in a subframe (or in a symbol interval) or to define a series of guard times using a series of time sample regions at start portions of symbols after the boundaries depending on the importance of the symbols. In the latter case, there may be no need to define a separate guard time if a time sample region of the guard time is defined in a cyclic shift region. However, this scheme may cause overall throughput degradation. Therefore, as a different scheme, it is possible to consider an SRS reception multiplexing allocation scheme in which the number of transmission antennas used for SRS transmission on an arbitrary LTE-A UE is set to be as equal to the number of transmission antennas used for PUSCH or PUCCH transmission in a different symbol interval as possible without defining such guard times. This can be taken into account as one important consideration in some suggestions of SRS transmission resource allocation or multiplexing schemes according to the present invention.

One of the important considerations when a receiver of an eNode B/cell performs uplink channel measurement using an SRS in the case where a UE transmits an SRS with suggested (or limited) UE transmission power is a transmission Power Spectral Density (PSD) level in a frequency region for an SRS transmission signal. Settings associated with allocation of power for individual SRS transmission while taking into consideration output power of an arbitrary symbol when performing SRS transmission resource allocation include setting of an SRS transmission band and setting of the degree of multiplexing in which Code Division Multiplexing (CDM) and/or Frequency Division Multiplexing (FDM) is implemented in an arbitrary frequency resource region. In addition, another consideration that needs to be made on an LTE-A UE is the number of uplink transmission antennas that are simultaneously used. That is, as the total number of SRS transmissions required in a cell increases as an extended SRS transmission procedure is required compared to the conventional SRS transmission in a situation in which an LTE-A UE supports transmission through multiple antennas at an arbitrary transmission time, there is a need to provide methods for providing a coverage in association with SRSs similar to the coverage of the LTE system and multiplexing and power allocation methods for supporting reliable measurement of individual SRS transmission. Another important consideration that should be taken into account is whether or not an LTE-A UE can perform antenna power pooling when performing multiple antenna transmission as described above.

The present invention suggests basic SRS multiplexing and resource allocation methods for supporting the important considerations in SRS design of the LTE-A described above.

Embodiment 1: Physical Resource Multiplexing for an SRS in an SRS Transmission Subframe In the case where another series of PUSCHs or PUCCHs is transmitted in a subframe including an SRS transmission symbol in an LTE-A system that supports multiple antenna transmission based on the configuration of RF chains and multiple power amplifiers, SRS transmission associated with layers (or streams) or physical or logical antennas (or antenna ports) that are used for PUSCHs or PUCCHs is performed through SRS transmission symbol(s) allocated to a subframe such as the channels (i.e., the PUSCHs or PUCCHs). As an SRS multiplexing method for supporting this SRS transmission, it is possible to consider CDM, FDM, or CDM/FDM in an SRS transmission symbol in an arbitrary subframe.

A factor for determining the basic multiplexing capacity in CDM is the number of available cyclic shifts in an SRS sequence. The number of available cyclic shifts may be determined based on a relation between the length of a Cyclic Prefix (CP) interval of a transport symbol (for example, an OFDM symbol or an SC-FDMA symbol) and a delay spread value of the channel. In one example, the number of available cyclic shifts may be explicitly configured as an RRC parameter in a higher layer (i.e., the RRC layer) for all or part of the cyclic shifts that are required for SRS transmission in an arbitrary LTE-A UE and then may be signaled through UE-specific RRC signaling. For some cyclic shifts, the number of available cyclic shifts may be implicitly configured without explicit signaling. As circumstances require, a base sequence index, which is referred to as a root index, in an SRS sequence may also be a factor for determining the multiplexing capacity together with the cyclic shift. This scheme may be selectively applied depending on the transmission mode of the UE or the channel environment. The indication of the scheme may be implicitly or indirectly set through a series of other signaling information. It is also possible to define an explicit signaling parameter for indicating the scheme.

Figure 7:
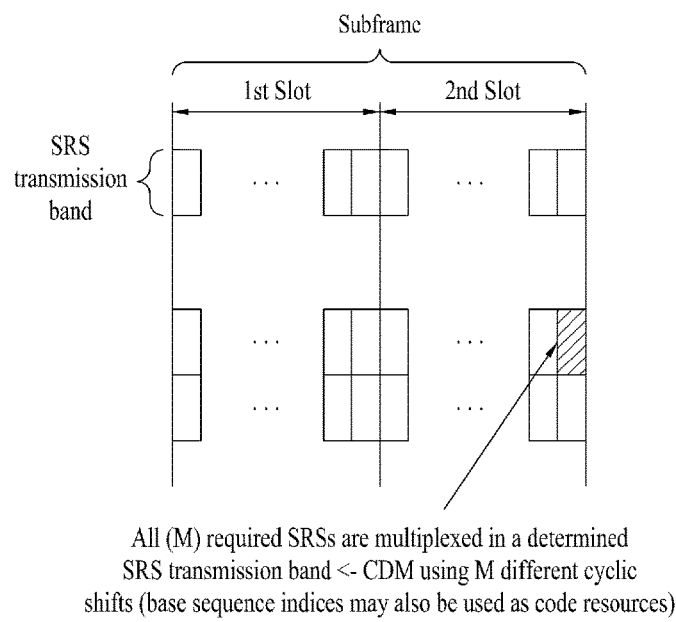
FIG. 7 illustrates a method for multiplexing Sounding Reference Signals (SRSs) in a Code Division Multiplexing (CDM) manner according to an embodiment of the present invention.

FIG. 7 illustrates exemplary CDM for the case where an SRS transmission symbol is the last of the transmission symbols of a subframe in which an arbitrary LTE-A UE transmits an SRS. Although FIG. 7 illustrates a situation in which SRSs of an LTE-A UE which are multiplexed in a CDM manner are transmitted with a limited SRS transmission band, the SRS transmission band may have a various size including the full system band.

As a specific example, it is preferable that CDM be applied to environments associated with UL coordinated multiple point (CoMP) transmission and reception and UL/DL CoMP and associated with LTE-A UEs rather than power-limited environments from the viewpoint of UE transmission power through power control due to high geometry. Indication of cyclic shifts of the degree of application of code division (and indication of base sequence indices associated with the total or partial number of cyclic shifts requiring the base sequence indices) may be additionally defined explicitly as an SRS related RRC parameter in association with application of CDM or CDM/FDM for SRSs that are to be transmitted by an arbitrary UE that performs multiple antenna transmission using multiple power amplifiers and/or RF chains. Here, examples of the degree of application of code division include a value associated with the number of code resource units to be used for transmission. In addition, the number of code resources that are used according to a UE MIMO transmission mode may be defined as a preset value. Alternatively, the number of code resources may be defined as an explicit RRC parameter and cyclic shift indices of the individual code resources (or base sequence indices in addition to the cyclic shift indices) and the remaining values may be implicitly specified using a rule or a series of offsets using one explicitly specified value.

As one factor for determining the degree of multiplexing in an arbitrary SRS transmission symbol when applying the FDM scheme, it is possible to consider an interval between each subcarrier used for transmission in an arbitrary frequency region, i.e., both a discrete comb mapping ratio (which can also be referred to as a comb division ratio) and a unit SRS transmission band allocated to an arbitrary UE. For example, in the LTE, the discrete comb mapping ratio is set to 2 so as to be used for discriminating resources between full-band soundings and sub-band soundings or for discriminating resource allocation between even subcarrier indices and odd subcarrier indices. The SRS transmission band has also been defined as respective values of various cases for each system band in a table. In the LTE-A, it is also possible to apply an increased discrete comb mapping ratio compared to the LTE when taking into consideration the multiple antenna transmission environment. For example, as 2*(the number of transmission antennas) or 2*(the number of transmission layers), the comb division ratio may have a value of 2 or 4 in the case of 2Tx and may have a value of 2, 4, 6, or 8 in the case of 4Tx. In the case where the comb division ratio is increased in this manner or is 2, all or partial comb frequency offsets may be used multiplexing of an SRS sequence of each antenna. In association with the SRS transmission band, power of each antenna of an arbitrary UE that supports multiple antenna transmission may be reduced by an amount corresponding to the number of the antennas compared to the single antenna or antenna selection case. Therefore, in order to secure the coverage of SRS transmission of each individual antenna (or individual layer) or to support reliable measurement of the same, it is possible to additionally define a smaller SRS transmission band in an arbitrary system band than to the case of an LTE UE that performs single antenna transmission. That is, it is possible to define smaller SRS transmission bands in an arbitrary system band than the case where SRS transmission of the conventional LTE is possible and to add candidates for the SRS transmission band with higher granularity than the same case. As a scheme that can be applied independent of this scheme or in addition to this scheme, it is possible to specify candidates to be applied in the form of a subset of the entire set of SRS transmission related parameters (including the transmission band) configured through RRC parameters for the case of multiple antenna transmission. The candidates may be specified through designation of an uplink transmission mode (for example, UE-specific RRC signaling or L1/L2 control signaling). It is also possible to define and signal an additional RRC parameter. Through these schemes, it is possible to maintain a subcarrier power spectral density (PSD) level that is required from the viewpoint of measurement quality or the coverage in association with SRS transmission for each antenna or layer. One method, which can be applied in parallel with or independent of this scheme, increases the discrete comb mapping ratio for UEs, each having a plurality of transmission antennas or for all UEs in a cell (eNode B). In this method, it is possible to relatively increase the power spectral density (PSD) of physical resources (i.e., subcarriers or resource elements (REs)) by reducing, in the frequency domain, the density of physical resources to which power allocated to an arbitrary antenna is allocated in a given SRS transmission band. In addition, it is possible to implement a series of FDM multiplexing by mapping SRS sequences transmitted through different (physical) transmission antennas to comb frequency offsets (i.e., unit comb patterns) that are obtained through the increase of the discrete comb mapping ratio. Channel measurement performance may be reduced as the discrete comb mapping ratio increases. In order to prevent the reduction of channel measurement performance, the discrete comb mapping ratio may be set to 3 in a situation in which the number of UE (physical) transmission antennas is 2 or 4. In this case, one comb pattern may be allocated for a specified range of all or wider channel soundings and, in the case where the number of transmission antennas is 2, respective SRS sequences of the antennas may be differently mapped to 2 remaining comb patterns. On the other hand, in the case where the number of UE transmission antennas is 4, the transmission antennas may be grouped to 2 antenna groups, each including 2 antennas, and the 2 antenna groups may be differently mapped to the 2 remaining comb patterns. In addition, it is possible to achieve multiplexing by allocating different frequency bands or code resources (i.e., cyclic shifts) to 2 transmission antennas in the antenna group.

Figure 8:
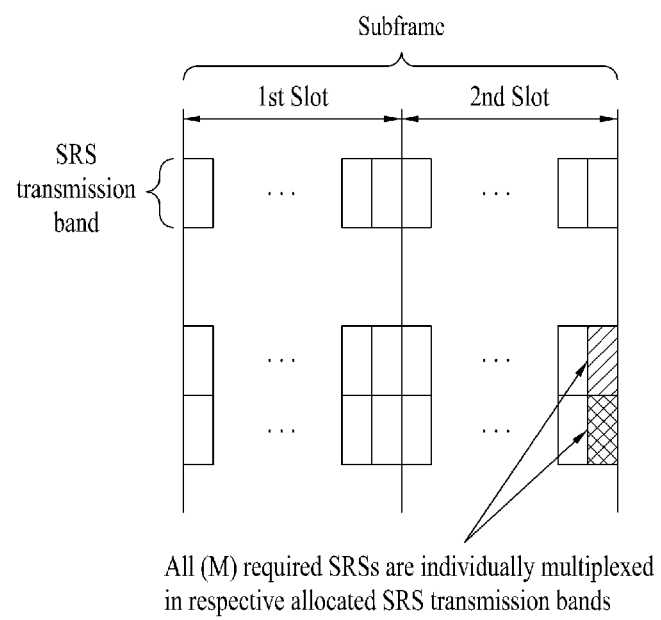
FIG. 8 illustrates a method for multiplexing SRSs in a Frequency Division Multiplexing (FDM) manner according to an embodiment of the present invention.

FIG. 8 illustrates exemplary FDM for the case where an SRS transmission symbol is the last of the transmission symbols of a subframe in which an arbitrary LTE-A UE transmits an SRS. Although FIG. 8 illustrates a situation in which SRSs of an LTE-A UE which are multiplexed in a FDM manner are transmitted with a limited SRS transmission band, the SRS transmission band may have a various size including the full system band. Here, it is to be noted that representations of SRS transmission bands, which are shown as bands discriminated from each other, may also be applied to the FDM scheme for discrete physical comb patterns described in the present invention.

It is preferable that the FDM or CDM/FDM scheme suggested in the present invention be applied to a UE which is in a non-power-limited situation. For example, it is preferable that the SRS FDM or CDM/FDM scheme enable non-contiguous Resource Block (RB) allocation through clustered Discrete Fourier Transform—spread—Orthogonal Frequency Division Multiple Access (DFT-s-OFDMA) in uplink or that the SRS FDM or CDM/FDM scheme be applied to a UE that can use component carrier (CC). To accomplish this, in the case where an indication of the application of the clustered DFT-s-OFDMA is explicitly or implicitly provided from an eNode B or an indication of the application of uplink multiple component subcarriers is explicitly or implicitly provided from an eNode B, it is possible to apply a multiplexing scheme in the form of applying FDM or CDM/FDM when multiplexing SRSs based on signaling of the indication. It is possible to define a parameter indicating that the SRS configuration is to be changed depending on the uplink transmission mode of the UE or depending on whether or not power of the UE is limited and to provide the indication through UE-specific RRC signaling or L1/L2 control signaling.

When the CDM/FDM scheme is applied, there is a need to take into consideration correlations between parameters for determining multiplexing granularity and capacity of CDM and parameters for determining multiplexing granularity and capacity of FDM rather than to take into consideration a simple combination of the two multiplexing schemes. For example, setting of the discrete comb mapping ratio for determining the frequency component density and the multiplexing level of an SRS signal in the FDM scheme has an influence upon determining the number of available cyclic shifts associated with the CDM capacity. Specifically, increasing the discrete comb mapping ratio value has an effect of decreasing the number of available cyclic shifts in the case of CDM. In addition, in the case where the base sequence index is set as a code resource region of CDM, the size of available base sequence index pools is determined in proportion to the size of an SRS transmission band of FDM. In the case where CDM/FDM is applied for SRS transmission multiplexing of LTE-A UEs that supports multiple antenna transmission using multiple power amplifiers and/or RF chains taking into consideration this fact, it is possible to define detailed schemes of CDM/FDM not only basically based on the efficiency of channel sounding but also based on factors such as signaling overhead reduction and backward compatibility. For example, in the case where PUSCH or PUCCH multiplexing is taken into consideration while achieving a design minimizing additional indication overhead of used cyclic shifts or decreasing the capacity of cyclic shifts, it is possible to configure SRS resource allocation/multiplexing as shown in FIG. 9 under the assumption that all SRSs are transmitted within an SRS transmission symbol according to the MIMO transmission mode or according to antennas configured for the UE.

Figure 9:
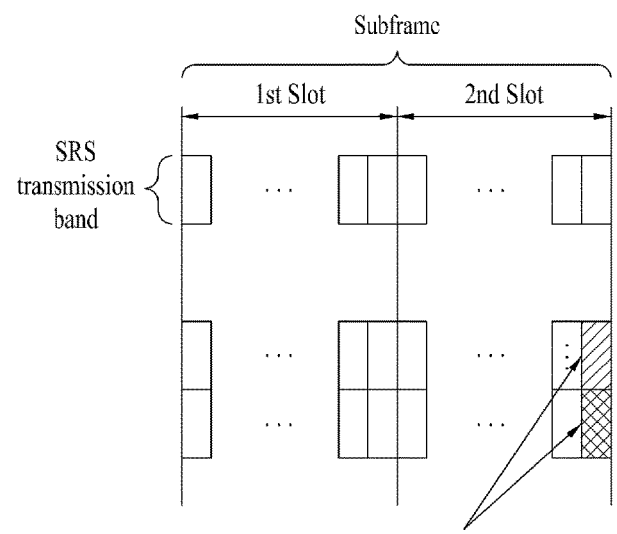
FIG. 9 illustrates SRSs in a CDM/FDM manner according to an embodiment of the present invention.

FIG. 9 illustrates an example of CDM/FDM in an uplink subframe of a UE (for example, an LTE-A UE) that transmits an SRS. Although FIG. 9 illustrates a situation in which SRSs of an LTE-A UE which are multiplexed in a CDM/FDM manner are transmitted with a limited SRS transmission band, the SRS transmission band may have a various size including the full system band. The following is a more detailed description of the example of FIG. 9. When an arbitrary LTE-A UE has M SRSs (M>0) that are to be transmitted in an arbitrary subframe, it is possible to use, as a method of allocating M SRS resources for SRS transmission, a method of allocating the number of cyclic shifts and indices to be used respectively for N used SRS transmission bands in order to optimize resource utilization. Unlike this method, it is possible to use a method in which the number and index information of P available cyclic shift resources (optionally together with a base sequence as a resource allocation element) and the number and position index information of N SRS transmission bands as illustrated in FIG. 9 in order to simplify signaling overhead or configuration. Here, it may be considered that N and P are specified such that N*P is equal to or greater than M. As a method of allocating respective resources for M SRSs, it is possible to apply a band-first assignment scheme for the SRS transmission band and it is also possible to apply a code-first assignment scheme for the cyclic shift.

In addition to the CDM, FDM, or CDM/FDM scheme described above, it is possible to apply, as other candidates, a series of SRS resource multiplexing and configurations such as CDM/TDM, FDM/TDM, and CDM/FDM/TDM to arbitrary LTE-A UEs. The following is a description of a method of changing the configuration of SRS, focusing upon the LTE-A. In the case of LTE, when SRS transmission is enabled, an SRS continues to be transmitted until a transmission termination event occurs (i.e., until SRS transmission is disabled) and an RRC parameter for releasing SRS transmission has not been defined. However, it can be considered that an SRS transmission release parameter is additionally set for an LTE-A UE. It is also possible to set the number of transmissions of an SRS or an SRS transmission time according to period configuration information after SRS transmission is enabled through UE-specific RRC signaling. It can also be considered that SRS transmission configuration information is transmitted using L1/L2 control signaling (for example, a PDCCH or MAC messaging). For example, it is possible to trigger SRS transmission through L1/L2 signaling. In this case, in order to efficiently reduce signaling overhead, L1/L2 control signaling carrying SRS transmission configuration information may be event-triggered or may have periodic characteristics. It is possible to employ (but not limited to) an example in which the number of valid transmissions, a transmission period, period configuration information, and the like are signaled while being included in L1/L2 control information. Here, periodic SRS transmission may be performed every period using a corresponding subframe and may be performed using consecutive S subframes, starting from the time of the transmission period. It is also possible to employ a periodic SRS transmission method in which a series of offsets are defined and an SRS is transmitted at intervals corresponding to the offsets. The periodic configuration information includes a transmission start point, a period, subframe group allocation information (in the case of periodic transmission in units of subframe groups), and the like. There is no need to separately define information regarding the transmission start time when the method complies with a general grant-to-uplink timing relation. In the case where SRS transmission is configured through UE-specific RRC signaling, all or part of the L1/L2 control information defined according to the present invention as described above may be defined as an RRC parameter. In addition, in the case where SRS transmission is enabled or triggered through L1/L2 control signaling, it is possible to additionally define an SRS transmission release parameter (or message) in L1/L2 control signaling.

In the following, as a more detailed scheme of the method for multiplexing physical resources for an SRS in an arbitrary SRS transmission subframe described above in the embodiment 1, the present invention suggests a method for applying an FDM scheme between antennas and a CDM scheme between UEs.

Specifically, the present invention suggests an FDM scheme applied between antennas and a CDM scheme applied between UEs which reuse the method applied to the conventional LTE sounding channel and maintains backward compatibility as much as possible.

i) It is possible to consider a method in which the discrete comb mapping ratio (or repetition factor (RPF)) described in the embodiment 1 is increased in proportion to the number of antennas (or the number of layers or the number of ranks).

Option 1) RPF=2 used in LTE may be used without change and, in addition, the RPF for multiple antennas in the LTE-A system which takes into consideration multiple antennas may be increased in proportion to the number of antennas (or the number of layers or the number of ranks). In this case, the length (or duration) $M_{sc,b}^{RS}$ of an SRS sequence may be defined as in the following Expression 8.

$$M_{sc,b}^{RS} = m_{SRS,b} N_{sc}^{RB}/\{2 \times L\}$$ [Expression 8]

Here, $m_{SRS,b}$ is a value given for each uplink band $N_{RB}^{UL}$ and is illustrated in Tables 1 to 4. L denotes the number of transmission antennas (or layers or ranks) for an SRS.

When the Number of Transmission Antennas (or Layers or Ranks) for SRS is 4

RPF=2 may be applied to the conventional LTE and RPF=4 may be additionally defined for 4 transmission antennas (or layers or ranks) in the case of LTE-A.

In the conventional LTE, the minimum transmission unit of an SRS for a single antenna is 4 RBs. Accordingly, 6 REs (=4RB*12 subcarriers/(2*4)) are allocated to each antenna (or each layer or each rank) in the case where distributed FDM is used for orthogonality between antennas and 4 transmission antennas (or 4 layers or 4 ranks) used in the LTE-A are used, taking into consideration the minimum RB allocation. Thus, a 6-length sequence for an SRS is required in the LTE-A. In this case, a CAZAC sequence (a ZC sequence or a sequence generated based on a truncation or extension scheme), a DFT based sequence, a PN sequence, or another type of orthogonal sequence may be used as the 6-length sequence. As a 6-length sequence, a 6-length computer-generated sequence may be created and used as it has been suggested and used as an RS sequence for 1RB (12-length) and 2RB (24-length) in the conventional LTE.

In the case where a new length-6 sequence is not defined and only the smallest 1RB-long (length-12) sequence among sequences currently used in the LTE is used, it is possible to consider a method of making a definition such that sounding band allocation of 8 RBs or more is possible using a parameter defined for sounding channel allocation in the LTE for the case where transmission of 4 Tx antennas (or 4 layers or 4 ranks) is used. For example, it is possible to consider a method of making a definition such that sounding band allocation of 8 RBs or more is possible using a 3-bit SRS band configuration (srs-BandwidthConfig, $C_{SRS}=\{0, 1, 2, 3, 4, 5, 6, 7\}$) that is signaled by a higher layer as a cell-specific parameter and a 2-bit SRS band (srs-BandwidthConfig, $B_{SRS}=\{0, 1, 2, 3\}$) that is signaled by a higher layer as a UE-specific parameter from among the parameters defined in the LTE.

In addition, it is possible to perform multiplexing for 4 transmission antennas (or layers or ranks) using an FDM scheme for up to 2 transmission antennas (layers or ranks) and using a CDM scheme, which allocates cyclic shift indices different from the indices 1 and 2, for the transmission antennas (layers or ranks) 3 and 4.

As another method, it is possible to consider a method in which a sounding channel is transmitted in a TDM manner for each 2 transmission antennas (or layers or ranks) through antenna switching for multiplexing SRSs for the 4 transmission antennas (or layers or ranks). In this case, there may be no need to design a small-length sequence due to an increase in the number of antennas. In the case where uplink transmission is performed using 4 power amplifiers and 4 transmission antennas, it is possible to perform multiplexing of SRSs for 4 transmission antennas (or layers or ranks) by enabling power-on/off through power control signaling, higher layer signaling, control signaling, or the like for power amplifiers of antennas that are not used when applying a 1 or 2 antenna switching scheme.

When the Number of Transmission Antennas (or Layers or Ranks) for SRS is 2

RPF=2 may be applied to the conventional LTE and RPF=4 may be additionally defined for 4 transmission antennas (or layers or ranks) in the case of LTE-A.

The minimum unit for transmitting an SRS for a single antenna used in the conventional LTE described in the related art is 4 RBs. Accordingly, 12 REs (=4RB*12 sub-carriers/(2*2)) are allocated to each antenna (or each layer or each rank) when distributed FDM is used for orthogonality between antennas in the case where 2 transmission antennas (or layers or ranks) used in the LTE-A are used, taking into consideration the minimum RB allocation. In this case, CDM may be performed for UEs, which use the same band, using a 1-RB computer-generated sequence defined in the LTE.

As another method, it is possible to consider a method in which a sounding channel is transmitted in a TDM manner for each transmission antennas (or layers or ranks) through antenna switching for multiplexing SRSs for 2 transmission antennas (or layers or ranks). In the case where uplink transmission is performed using a single power amplifier and 2 transmission antennas, it is possible to perform multiplexing of SRSs for 2 transmission antennas (or layers or ranks) by enabling power-on/off through power control signaling, higher layer signaling, control signaling, or the like for power amplifiers of antennas that are not used when applying a 1-antenna switching scheme.

Option 2) The same RPF as that of the LTE may be maintained when the number of antennas (or layers or ranks) for uplink sounding transmission used in the LTE-A system is 1 and the RPF for multiple antennas in the LTE-A system may be increased in proportion to the number of antennas (or the number of layers or the number of ranks) when the number of antennas (or layers or ranks) for uplink sounding transmission used in the LTE-A system is 2 or more. In this case, the length (or duration) $M_{sc,b}^{RS}$ of an SRS sequence may be defined as in the following Expression 9.

$$M_{sc,b}^{RS} = m_{SRS,b} N_{sc}^{RB}/2 \cdot \{\text{floor}(L/4)+1\} \quad \text{[Expression 9]}$$

Here, $m_{SRS,b}$ is a value given for each uplink band $N_{RB}^{UL}$ and is illustrated in Tables 1 to 4. L denotes the number of transmission antennas (or layers or ranks) for an SRS.

When the Number of Transmission Antennas (or Layers or Ranks) for SRS is 4

RPF=2 may be applied to the conventional LTE and RPF=4 may be additionally defined for 4 transmission antennas (or layers or ranks) in the case of LTE-A.

The minimum unit for transmitting an SRS for a single antenna used in the conventional LTE described in the related art is 4 RBs. Accordingly, 12 REs (=4RB*12 sub-carriers/(2*2)) are allocated to each antenna (or each layer or each rank) in the case where distributed FDM is used for orthogonality between antennas and 4 transmission antennas (or 4 layers or 4 ranks) used in the LTE-A are used, taking into consideration the minimum RB allocation. In this case, CDM may be performed for UEs, which use the same band, using a 1-RB computer-generated sequence defined in the LTE.

In addition, it is possible to perform multiplexing for 4 transmission antennas (or layers or ranks) using an FDM scheme for up to 2 transmission antennas (layers or ranks) and using a CDM scheme, which allocates cyclic shift indices different from the indices 1 and 2, for the transmission antennas (layers or ranks) 3 and 4.

As another method, it is possible to consider a method in which a sounding channel is transmitted in a TDM manner for each 2 transmission antennas (or layers or ranks) through antenna switching for multiplexing SRSs for the 4 transmission antennas (or layers or ranks). In this case, there may be no need to design a small-length sequence due to an increase in the number of antennas. In the case where uplink transmission is performed using 4 power amplifiers and 4 transmission antennas, it is possible to perform multiplexing of SRSs for 4 transmission antennas (or layers or ranks) by enabling power-on/off through power control signaling, higher layer signaling, control signaling, or the like for power amplifiers of antennas that are not used when applying a 1 or 2 antenna switching scheme.

When the Number of Transmission Antennas (or Layers or Ranks) for SRS is 2

RPF=2 may be applied to the conventional LTE and RPF=1 may be additionally defined for 4 transmission antennas (or layers or ranks) in the case of LTE-A.

The minimum unit for transmitting an SRS for a single antenna used in the conventional LTE described in the related art is 4 RBs. Accordingly, 24 REs (=4RB*12 sub-carriers/(2*1)) are allocated to each antenna (or each layer or each rank) when distributed FDM is used for orthogonality between antennas in the case where 2 transmission antennas (or layers or ranks) used in the LTE-A are used, taking into consideration the minimum RB allocation. In this case, CDM may be performed for UEs, which use the same band, using a 2-RB computer-generated sequence defined in the LTE.

As another method, it is possible to consider a method in which a sounding channel is transmitted in a TDM manner for each transmission antennas (or layers or ranks) through antenna switching for multiplexing SRSs for 2 transmission antennas (or layers or ranks). In the case where uplink transmission is performed using a single power amplifier and 2 transmission antennas, it is possible to perform multiplexing of SRSs for 2 transmission antennas (or layers or ranks) by enabling power-on/off through power control signaling, higher layer signaling, control signaling, or the like for power amplifiers of antennas that are not used when applying a 1-antenna switching scheme.

The following is a more detailed description of additional aspects of the FDM scheme applied between antennas as a method for maintaining backward compatibility of the SRS transmission scheme as much as possible.

It is possible to consider a method in which an SRS is transmitted through each antenna while maintaining a band allocated to each antenna in a disjoint manner by uniformly distributing the full system band such that a band allocated for each transmission is proportional to the number of antennas to be used for the transmission.

Power-Limited Case

Figure 10:
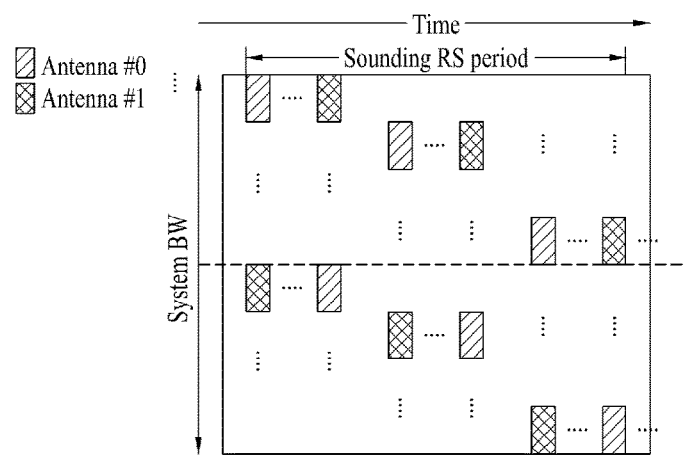
FIGS. 10 to 13 illustrate an example in which SRS resources are allocated in a disjoint manner for each antenna according to an embodiment of the present invention.
Figure 11:
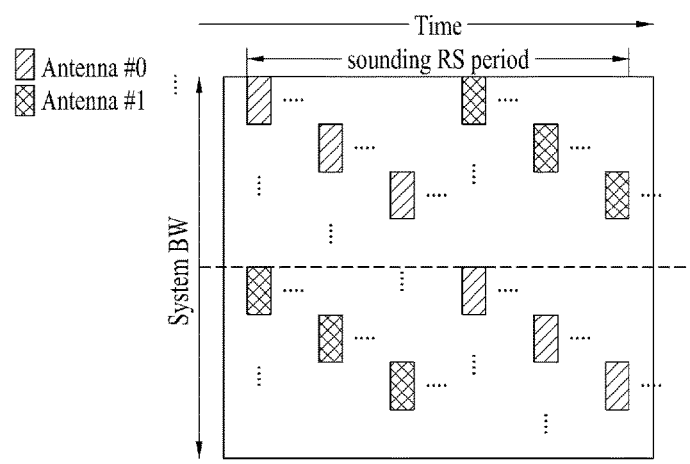
Figure 12:
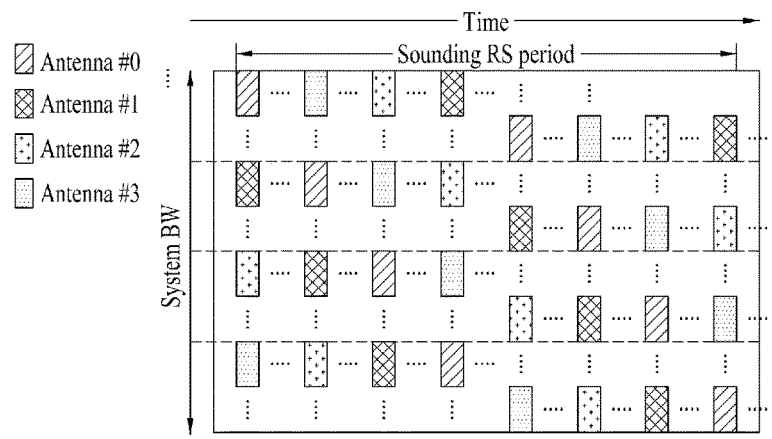
Figure 13:
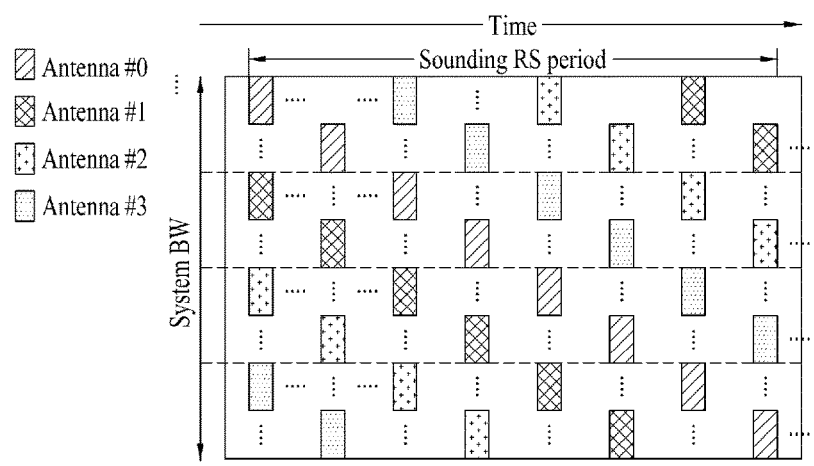

In the power-limited case, there is a need to perform transmission so as to maintain a low Cubic Metric (CM) for an SRS transmitted through each antenna. Accordingly, it is possible to use a method of performing transmission in a disjoint manner between antennas. FIGS. 10 and 11 illustrate a case of 2 transmission antennas (or layers or ranks) and FIGS. 12 and 13 illustrate a case of 4 transmission antennas. Referring to FIGS. 10 to 13, SRS bands for different antennas are allocated in a disjoint manner such that SRS bands of the antennas are at intervals of a spacing corresponding to the system band/(the number of transmission antennas (or layers or ranks)).

Non-Power-Limited Case (e.g., when Clustered DFTs-OFDM, Multiple Component Carriers, or UL ComP is Used)

In the non-power-limited situation, there is no need to keep the limitation of having to maintain the same CM as a single carrier. Accordingly, it is possible to transmit an SRS through different sounding bands in one symbol. In this case, it is possible to reduce time resources required to sound the entire uplink system band.

Unlike the LTE, the LTE-A supports non-contiguous allocation using an uplink transmission scheme which is based on clustered DFTs-OFDM. In the case of a sounding channel, non-power-limited UEs can transmit a sounding channel using the clustered DFTs-OFDM scheme. Accordingly, it is possible to allocate multiple resources to each antenna. However, assuming that the number of frequency start indices for SRS allocation used in the LTE is maintained at 1 for backward compatibility, it is possible to use a method in which multiple SRSs are transmitted through each antenna while maintaining a band allocated to each antenna in a disjoint manner by applying an RPF equal to the number of antennas (or layers or ranks) between each antenna and uniformly distributing the full system band such that a band allocated for each transmission is proportional to the number of antennas to be used for the transmission. It is also possible to use a method in which multiple resources, the amount of which depends on the number of clusters, are allocated for SRS transmission.

The methods of option 1) and option 2) of this embodiment described above may be applied to the method of applying an RPF between each antenna.

It is preferable that allocation be performed such that the CM value for a sequence allocated to an SRS that is transmitted using multiple resources through each antenna is not significantly increased compared to the single carrier CM of the LTE. That is, the CM value of transmission of an SRS through multiple resources is significantly increased in the case where the same cyclic shift as the same base sequence is used for each cluster. Accordingly, it is possible to consider a method in which different cyclic shift values are allocated to multiple resources or different base sequences are allocated to multiple resources. As a method of allocating a cyclic shift index to each cluster, it is possible to consider a method in which a resource corresponding to each cluster is allocated using a cyclic shift index that has been defined to be signaled through higher layer signaling in the LTE.

Embodiment 2: Definition of a Plurality of SRS Transmission Symbols in an SRS Transmission Subframe The LTE-A supports multiple antennas or multilayer transmission based on the multiple antennas by applying multiple power amplifiers/RF chains in uplink. Independent of or in parallel with such multi-antenna transmission, the LTE-A enables access to a plurality of UL components carriers and enables communication with a plurality of points through UL CoMP. Accordingly, when configuring a multi-antenna configuration, it is possible to configure a plurality of SRS transmissions in order to guarantee multiplexing capacity, coverage, and measurement reliability in channel sounding for each individual antenna (or layer), for each UL component carrier, or for each UL CoMP-based transmission point. In order to accomplish this, the present invention suggests that a plurality of SRS transmission symbols be defined in an uplink subframe of a UE (for example, an LTE-A UE). For ease of explanation, a description will now be given of two configuration methods associated with depending on positions in a subframe when the number of SRS transmission symbols is defined to be 2.

Figure 14:
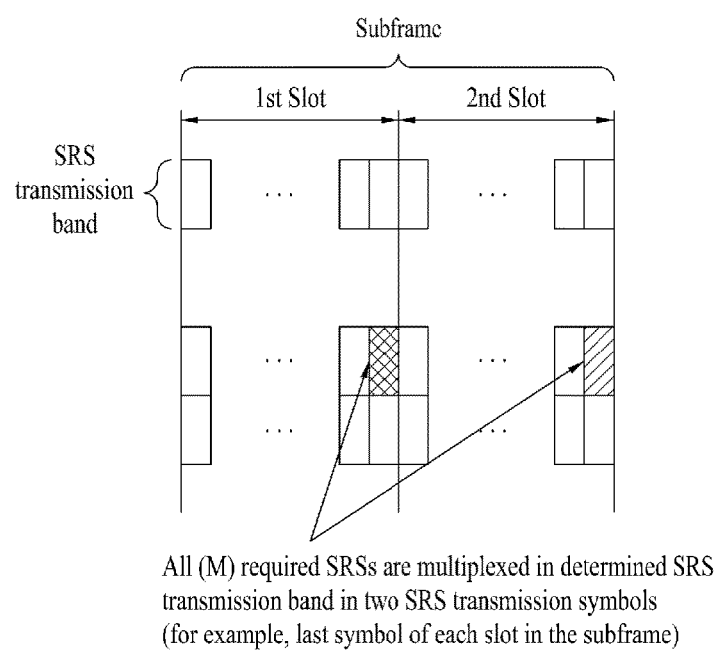
FIGS. 14 and 15 illustrate an example in which a plurality of SRS transmission symbols is configured in a subframe according to an embodiment of the present invention.

FIG. 14 illustrates a first method for specifying two SRS transmission symbols in an uplink subframe according to an embodiment of the present invention. As shown in FIG. 14, a position of an SRS transmission symbol that is additionally defined compared to the conventional LTE may be defined to be located at a last transmission symbol (for example, OFDM or SC-FDMA symbol) of a first slot in a subframe that transmits an SRS of a corresponding UE. To accomplish this, shortened PUCCH formats that have been used when an SRS is transmitted through two slots in the conventional LTE may be defined to be still used in the first slot according to the present invention.

Figure 15:
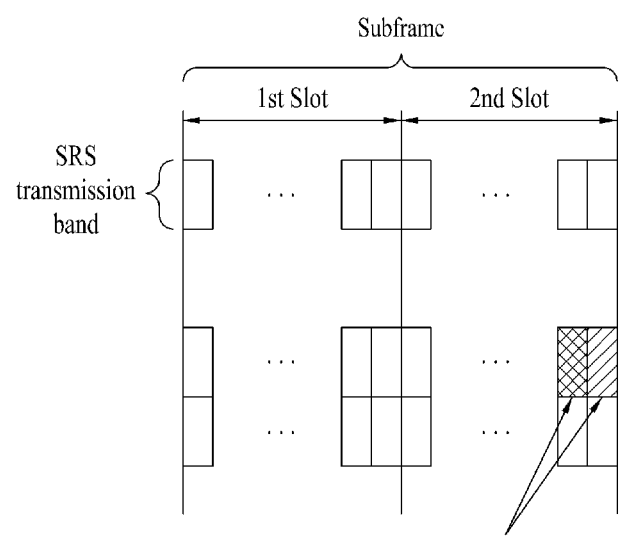

FIG. 15 illustrates a second method for specifying two SRS transmission symbols in an uplink subframe according to an embodiment of the present invention. As shown in FIG. 14, a position of an SRS transmission symbol that is additionally defined compared to the conventional LTE may be defined to be located at a second last transmission symbol (for example, OFDM or SC-FDMA symbol) of a second slot in a subframe that transmits an SRS of a corresponding UE. This scheme has an advantage in that the frequency of occurrences of power transition between an SRS transmission symbol and a data transmission symbol is the same as that when one SRS transmission symbol is defined in a subframe as in the conventional LTE. To accomplish this scheme, there is a need to additionally define a shortened PUCCH format in which 2 last transmission symbols are punctured in an arbitrary slot based on the conventional LTE standard. The method of transmitting control information through a PUSCH of the conventional LTE uses rate matching of data and maps Rank Information (RI) to physical frequency resources of 4 transmission symbols in a subframe. For example, in the case of a normal CP, the RI is mapped to second and fifth transmission symbols in each slot of a subframe. In this case, the position of the fifth transmission symbol of the second slot to which the RI is mapped overlaps the position of the additional SRS transmission symbol suggested in the present invention. Accordingly, to apply this method, it is possible to consider an RI transmission method which uses three transmission symbols, excluding the transmission symbol that is defined as the last symbol in the second slot, among the four transmission symbols used for RI transmission. In addition, it is possible to consider a method in which RI is mapped to physical resources, starting from the first physical resource of the subframe, in a time-first manner or in which RI is mapped in a reversed order, starting from the last physical resource. In this case, the RI is mapped to transmission symbols, excluding or avoiding the transmission symbol to which an SRS is mapped, in a time-first manner. It is also possible to consider a method in which the scheme of multiplexing CQI and data defined in the conventional LTE is additionally applied to RI such that RI is transmitted in a form of being multiplexed with data. In this case, RI is mapped to physical resources of a subframe in a time-first manner.

In the first and second suggested methods, it is possible to reduce the burden of having to individually define and signal a configuration parameter for an SRS transmission symbol for each slot. In addition, in order to prevent the occurrence of transient operation of a power amplifier (and/or signal amplifier) of each individual antenna at boundaries between SRS transmission symbols and data symbols, it is possible to apply a method in which M SRS allocations required for a corresponding LTE-A UE are configured on an individual symbol instead of being divided on a symbol by symbol basis and the M SRS allocations are repeated in an SRS transmission symbol defined for each slot such that power allocated to each of the M SRSs is the sum of powers allocated to two SRS transmission symbols. It is also possible to employ a configuration in which individual SRS bands are set at different positions for each slot while SRS resources are equally allocated to each slot in two SRS transmission symbols as described above so that two uplink channel soundings are achieved in an arbitrary uplink subframe. The scheme in which the same SRS transmission bands are applied, the scheme in which different SRS transmission bands are applied, the scheme in which two SRS transmission symbols are used, and the scheme in which one SRS transmission symbol is used may be selectively applied individually or in combination depending on the situation of the UE. Indication information for configuring an SRS may be explicitly signaled using an additionally defined RRC parameter or may be explicitly or implicitly applied using L1/L2 control signaling or may be applied implicitly applied according to setting information of the transmission mode or the state of the UE. The transmission mode information may include information indicating whether or not MIMO transmission is performed, information indicating whether or not non-contiguous RB allocation based transmission is performed, and the like.

As another method, it is possible to configure an overall multiplexing scheme in which, for two SRS transmission symbols in an arbitrary SRS transmission subframe, M SRSs that are to be transmitted by an arbitrary LTE-A UE are transmitted so as to be discriminated for each SRS transmission symbol by additionally applying a TDM scheme to the embodiments of the CDM, FDM, and CDM/FDM described in the present invention in order to reduce the time required for channel sounding for the entire scheduling band. Here, code resources of SRS bands and/or cyclic shifts applied to the two SRS transmission symbols (optionally together with a base sequence index) may be specified independently in each individual SRS transmission symbol. Here, as an additional method, the SRS transmission bands and the code resources may be intentionally configured so as to be discriminated using different arbitrary resource values. In consideration of signaling overhead of SRS-related RRC parameters that need to be additionally defined to accomplish this scheme, the SRS transmission bands and the code resources applied to the two SRS transmission symbols may be commonly allocated (for example, the SRS transmission bands and the code resources may be configured equally in terms of RRC parameters, control information, and code and frequency resource allocation) and indication information used to discriminate resource allocation of individual SRSs in the two SRS transmission symbols may be additionally defined in control information in L1/L2 control signaling or in an RRC parameter.

Embodiment 3: Precoded SRS Configuration

It is possible to consider precoded SRS transmission as a method for securely reducing the number of SRSs required for a corresponding UE and for solving the problem of power amplifier on/off for SRS transmission for LTE-A UEs that support multiple antenna transmission through multiple power amplifiers/RF chains. According to this embodiment, even in a situation in which a plurality of UE transmission antennas is configured, it is possible to define and use a single SRS resource in the case of rank-1 MIMO transmission and to define and use a number of SRS resources equal to a corresponding rank value in the case of higher rank MIMO transmission when performing Uplink Multiple Input Multiple Output (UL MIMO). Precoding matrixes used for SRS precoding may be applied according to precoding matrix index (PMI) information specified in the most recent uplink grant information. (Here, the same code book as a code book defined for uplink data transmission is used as a code book of PMI or Transmit Precoding Matrix Indication (TPMI) for SRS transmission.) Unlike this method, it is possible to consider a method in which PMI information for SRS transmission is separately signaled through a series of L1/L2 control signaling including the case of UL grant or UE-specific RRC signaling. In addition, it is possible to configure PMIs applied to all of an SRS or a DeModulation Reference Signal (DM-RS)/SRS as a code book of PMIs in a different form from a conventional data transmission code book for each layer (rank) number and to define signaling information through UE-specific RRC signaling or L1/L2 control signaling indicating a PMI to be applied from among the PMIs of the code book. As another method, it is also possible to apply a method in which, for uplink data using Transmit Diversity (TxD), one SRS and/or DM-RS resource is allocated using the PMIs described above in the same manner as in the case of rank-1 for all of an SRS, a DM-RS, or an SRS/DM-RS and to transmit the corresponding RS based on the allocated resource. Here, it is possible to apply a PMI(s) from among PMIs for a single layer in a code book separately defined for RS transmission or a data transmission code book as described above. Taking into consideration the fact that TxD is associated with open-loop transmission, it is possible to consider a method in which the eNode B indicates a separate PMI to the UE through UE-specific RRC signaling or L1/L2 control signaling. Unlike this method, according to the open-loop characteristics, it is also possible to apply a series of cycling, shifting, or permutation schemes through a transmission symbol or a slot level for a PMI used for a series of subsets or an entire set of single layer PMIs in a different manner in the time domain or in the frequency domain. When the operation range of TxD is taken into consideration, the PMIs to be used may be selected and configured taking into consideration the Cubit Metric/Peak to Average Power Ratio (CM/PAPR) characteristics based on single antenna transmission and may also be configured of PMIs of antenna selection format in order to prevent beam formation.

The methods which apply precoding to an SRS (or DM-RS) according to this embodiment, together with methods which do not apply precoding, may be selectively applied to an arbitrary LTE-A UE. Here, as a criterion for selective application, it is possible to consider whether or not the UE is in a power-limited state, the UL MIMO transmission mode (rank or TxD/precoding), and the like. Detailed examples include a scheme in which a precoded SRS (or DM-RS) is transmitted for the rank 1 which includes or does not include TxD and a non-precoded SRS (or DM-RS) is transmitted for a higher rank. In another method, a precoded SRS (or DM-RS) is transmitted for the rank 1 and the rank 2 which include or do not include TxD and a non-precoded SRS (or DM-RS) is transmitted for a higher rank. As another detailed embodiment, it is possible to consider a scheme in which, for a DM-RS, precoding is applied to the rank 1 or to both the rank 1 and the rank 2 for data transmission in a corresponding subframe and a scheme independent from this scheme in which, for an SRS, precoding is performed with a PMI based on the rank 1 only in a limited situation or regardless of the channel state of the UE. As another method, it is also consider a scheme in which orthogonal resources discriminated in the spatial domain are defined with PMIs for an arbitrary scheme among all types of SRS transmission resource allocation and multiplexing schemes. In this case, a method in which SRSs are precoded with a series of rank-2 PMIs in a code book for data transmission or a different code book for SRS transmission may be applied selectively depending on the situation of the power-limited UE or may always be applied regardless of the channel condition of the UE. The PMIs used in this case are PMIs that provide a single antenna based CM/PAPR and it is possible to define control information of L1/L2 control signaling or UE-specific signaling for indicating a PMI to be used for SRS precoding. Unlike this method, a series of schemes such as cycling, shifting, or permutation schemes may be applied differently in the time domain or the frequency domain through a slot level or a transmission symbol for a PMI set that is applied in an open-loop manner based on an arbitrary criterion according to the present invention. Here, the PMI set may be defined as all PMIs or as a series of subsets.

Embodiment 4: SRS Transmission Method in UL Carrier Aggregation Situation

In the case where a cell eNode B allocates multiple uplink component carriers to an arbitrary LTE-A UE, RRC parameters regarding configuration information such as the time of transmission and SRS resource allocation of each carrier among individual UL component carriers in association with SRS transmission may be acquired as independent control information of each carrier through UE-specific RRC signaling and each independent SRS transmission scheme may be implemented in each UL component carrier. As a method for applying an association of inter-carrier SRS resource allocation and a transmission scheme configuration, it is possible to apply a method in which a corresponding offset value between UL component carriers set at the transmission start point are applied according to an explicit or implicit rule in order to configure a subframe to be transmitted in units of component carriers in a staggering manner while applying the same SRS transmission period to each carrier in order to prevent an increase in the CM/PAPR for uplink SRS transmission using multiple component carriers.

Embodiment 5: SRS Transmission Method for Antenna Transmission Mode

The suggested methods for channel sounding according to the configuration of a plurality of uplink transmission antennas according to the present invention have been described mainly with reference to the case where a signal is transmitted using all (physical) transmission antennas (i.e., power is loaded to all (physical) transmission antennas) in an uplink multiple antenna transmission scheme that is applied to PUSCH or PUCCH transmission symbols excluding SRS symbol(s) in an SRS transmission subframe. However, there is a possibility that an antenna selection precoder is defined on a code book and is applied to corresponding data transmission symbols or an uplink transmission diversity mode of an antenna selection or antenna group selection scheme of a closed-loop mode (for example, a long-term or short-term mode) is applied in the case of, for example, uplink precoding as the technology is applied to the system. Basically, it is possible to apply the multiple antenna channel sounding method suggested in the present invention in the case where such transmission modes are introduced. In addition, it is possible to apply methods for minimizing the occurrence of turning on/off of a series of antenna power amplifiers and/or signal amplifiers between data transmission symbols and SRS transmission symbols when implementing detailed operations and procedures of the multiple antenna channel sounding method in a transmission mode having such characteristics. In the following, the present invention suggests methods for applying channel sounding in the case where only specific (physical) antennas among all (physical) transmission antennas of the UE participate in uplink signal transmission.

Embodiment 5-1: Channel Sounding when Antenna Turn-on/Off Precoder is Applied

In the case where a UE performs uplink transmission using multiple antennas, antenna gain imbalance (AGI) may occur due to hand gripping of the user. In this case, transmission signals that are actually emitted from all or partial transmission antennas undergo a lost of 6 dB or greater in terms of output power. When the eNode B has determined that an AGI has occurred in a transmission antenna signal of a UE by observing a signal (for example, a DM-RS or an SRS) transmitted from the UE, the eNode B may provide signaling to allow part of the transmission antennas to turned off in order to prevent unnecessary power consumption of the transmission antennas. On the other hand, there is a need for the eNode B to provide signaling to allow some transmission antennas to be turned on. To accomplish this, the eNode B may apply turn-on/off precoders associated with antennas, in which an AGI has occurred, to a code book and may specify this application of the turn-on/off precoders through a series of UE-specific L1/L2 control signaling (for example, indication of a precoder in a DCI format in a UL grant). As another method, it is possible to make an instruction to directly turn on/off output power of a transmission antenna, in which an AGI has occurred, through separate (or additional) UE-specific RRC signaling or UE-specific L1/L2 control signaling in a separate control channel DCI format. In this suggestion, when a power control mechanism is individually defined for each individual transmission antenna (or layer) or a power control mechanism is defined for each UE in a PUSCH power control mechanism of the UE, the power control mechanism may be defined by multiplying an entire power control mechanism equation by a value of "1" as a signaling parameter in the "turn-on" case and by a value of "0" as a signaling parameter in the "turn-off" case. Of course, detailed equations, which can implement "turn-on/off" using the signaling parameter, may be included in the suggestions of the present invention. The following is a summary of methods for preventing the occurrence of turn-on/off transition of power amplifiers and/or signal amplifiers at boundaries between data transmission symbols and SRS transmission symbols in the case where the precoding transmission mode having such characteristics is applied to the data transmission symbols. The methods suggested in the following description may also be applied as SRS transmission-related schemes when a series of antenna or antenna-group selection precoders, which are not the antenna turn-on/off precoders introduced due to causes such as AGI, are applied. First, an embodiment of the present invention is described below with reference to an antenna turn-on/off precoder.

Taking into consideration that an AGI occurs a semi-static manner, detailed configurations of SRS transmission (for example, configurations associated with SRS transmission timing, a detailed multiplexing scheme, an SRS band, and the like) are reconfigured at the time when the precoder for antenna turn-on/off described above is applied or when it is applied to power control through signal in the eNode B and SRS signals for antennas (or power amplifiers and signal amplifiers) which are in a turn-on state from among all (physical) transmission antennas of the UE are multiplexed and transmitted in uplink in SRS transmission symbols according to an arbitrary scheme among the multiplexing schemes suggested in the present invention or according to a different multiplexing scheme. This may prevent the occurrence of turn-on/off transition of power amplifiers and/or signal amplifiers at boundaries between data transmission symbols and SRS transmission symbols.

To allow a cell or an eNode B to monitor semi-static change of an AGI state in a situation in which channel sounding limited to some of all antennas (or layers, power amplifiers or signal amplifiers) of the UE is implemented as in the schemes described above as an AGI occurs, it is necessary for the UE to perform channel sounding for all antennas at regular intervals to allow the cell or eNode B to measure change of the AGI state. To accomplish this, detailed SRS transmission configurations may be reconfigured through UE-specific RRC signaling so as to perform channel sounding in an entire or partial system band for all antennas during a time duration sufficient for measurement at intervals of an appropriate period. UE-specific RRC signaling for reconfiguring the detailed SRS transmission configurations may be performed in a periodic manner or an event-triggered manner.

Figure 16:
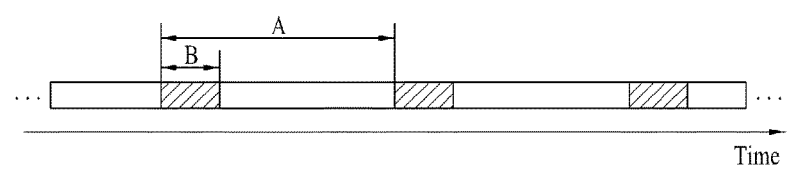
FIG. 16 illustrates a procedure for performing channel sounding according to an embodiment of the present invention.

FIG. 16 illustrates an example in which a UE performs channel sounding through multiple antennas according to an embodiment of the present invention. In the example of FIG. 16, it is assumed that an AGI has already occurred such that some antennas (layers, power amplifiers, or signal amplifiers) of the UE have been turned off and thus detailed SRS transmission configurations have been limited to (physical) transmission antennas that are in a turn-on state. The antenna turn-off state can be applied only to a specific frequency band or a specific (physical) channel (for example, a specific SRS transmission symbol). In the case where at least part of the transmission antennas have been set to a turn-off state, the eNode B needs to observe a signal transmitted from the UE in order to check whether or not the UE has escaped from the AGI situation. To accomplish this, the UE may perform channel sounding by turning on/off the transmission antennas that have been set to a turn-off state in a periodic manner or an event-triggered manner. That is, when at least partial transmission antennas of the UE have been set to a turn-off state, the UE may perform channel sounding by temporarily turning the transmission antennas on at intervals of a specific period or according to a specific event while basically maintaining the turn-off state of the transmission antennas. For example, the UE may perform channel sounding of a partial or entire system band for all (physical) transmission antennas by turning on all (or partial) (physical) transmission antennas of the UE during a duration B at intervals of a duration A. To accomplish this, a turn-on precoder may be applied to an SRS transmission symbol during the duration B and a turn-off precoder may be applied to an SRS transmission symbol at a subsequent duration. The duration A corresponds to a channel sounding transmission period applied to the antennas that are in a turn-on state. Here, the duration A may be set to be longer than the channel sounding transmission period set for the antennas that are in a turn-on state. Specifically, the duration A may be set to a multiple of the channel sounding transmission period set for the antennas that are in a turn-on state. In the case where channel sounding through the duration B is performed in an event-triggered manner (for example, through L1/L2 control signaling), the duration A may not be separately defined/signaled.

In combination with this method, it is possible to prevent the occurrence of turn-on/off transition of power amplifiers and/or signal amplifiers at boundaries between data transmission symbols and SRS transmission symbols in a subframe by turning on all (or partial) (physical) transmission antennas through UE-specific RRC signaling, UE-specific L1/L2 control signaling or UE-specific UL grant PDCCH transmission by a cell or an eNode B in the case where an antenna turn-off state has been achieved through a power control mechanism or by allowing precoders other than turn-on/off precoders to be used in association with the data transmission symbols in the case where the turn-on/off state of the transmission antennas have been temporarily transitioned to a turn-on state for channel sounding (during the duration B). In this scheme, the durations A and B may be directly defined as a time and may also be set in units of subframes, each corresponding to, for example, 1 ms, or in units of radio frames, each corresponding to, for example, 10 ms.

In another scheme, in the case where the eNode B desires to perform measurement for checking whether or not the AGI situation of the UE has changed in an event-triggered manner, the eNode B may make an instruction to perform channel sound of all (or partial) (physical) transmission antennas during a preset duration or an explicitly or implicitly signaled duration (for example, the duration B) through L1/L2 control signaling (for example, through a UL grant PDCCH, a power control PDCCH, or a dedicated PDCCH, or the like). In the case where channel sounding is performed during the duration B, each precoder for a data transmission symbol may be specified as a precoder other than an antenna turn-on/off precoder. This event-triggered signaling may also be specified as UE-specific RRC signaling. This event-triggered scheme may be implemented by specifying a precoder in a UL grant DCI format using a precoder of a data transmission symbol while being tied with reconfiguration of detailed SRS transmission configurations.

In this scheme, in the case where precoding is applied to an SRS and a precoder in a UL grant is specified not only using a precoder of a data transmission symbol but also using a precoder of an SRS transmission symbol, antenna turn-on/off of (physical) transmission antennas that transmit SRSs may be naturally implemented in a code book. Of course, the suggestions of this embodiment may also be applied in the case where an SRS is precoded.

Embodiment 5-2: Channel Sounding in the Case where a Transmission Diversity Scheme Based on Antenna (Group) Selection is Applied All channel sounding schemes suggested in the above embodiment 5-1 may be applied to this embodiment. This embodiment differs from the embodiment 5-1 in that UE-specific/cell-specific RRC control signaling for SRS resetting (or reconfiguration) is performed in order to perform channel sounding of corresponding (physical) transmission antennas in a situation in which the antennas (or power amplifiers or signal amplifiers) are in a turn-off state when performing detailed SRS transmission configuration at the time when antenna selection specification for a series of AG's or other specific channel information is performed through UE-specific RRC signaling, a UE-specific UL grant PDCCH, or a different type of UE-specific dedicated PDCCH. In addition, the same schemes as the detailed schemes of the embodiment 5-1 may be applied to parameters that are signaled through a power control mechanism that is individually defined for a (physical) transmission antenna or through a power control mechanism of the UE in association with antenna turn-on/off on the UE.

Embodiment 5-3: Channel Sounding when Dynamic Antenna Selection Precoder is Applied It is possible to apply any of the detailed schemes for SRS transmission suggested in the embodiment 5-1, taking into consideration that basic SRS setting is performed in a semi-static manner in the case where an antenna selection precoder is applied in a dynamic or semi-static manner. In addition, it is possible to apply the suggested schemes of the embodiment 5-1, in which the precoded SRS is applied, and also to consider a scheme in which an event-triggered-based SRS is used.

Embodiment 5-4: Channel Sounding when an Antenna or Antenna-Group Selection Based Transmission Mode (which can be Represented as a Type of Transmission Diversity Scheme) is Applied Basically, it is possible to apply any of the schemes suggested in the embodiment 5-1 in the case where closed-loop or open-loop antenna selection is implemented using one or more power amplifiers and (physical) transmission antennas from among power amplifiers and (physical) transmission antennas provided in an arbitrary UE in a dynamic or semi-static manner (for example, using UE-specific RRC setting (signaling)). Here, each (physical) transmission antenna may be fixedly connected to a specific power amplifier or may be switchably connected to outputs of a series of power amplifiers. The following is a more detailed description of a method for minimizing the occurrence of transition of power amplifiers and transmission antennas at boundaries of data transmission symbols and SRS transmission symbols when SRS transmission is performed and minimizing the impact (or influence) of the transition of the power amplifiers and the transmission antennas.

In a situation in which antenna or antenna group selection is performed when an antenna or antenna group selection based transmission mode (which can be represented as a type of transmission diversity scheme) is applied, the eNode B may reconfigure detailed SRS transmission configurations (for example, SRS transmission timing, detailed multiplexing schemes, SRS band, and the like) and signal reconfigured configurations to the UE at the time when the transmission mode is applied. On the other hand, the UE multiplexes and transmits SRSs for antennas (or power amplifiers and signal amplifiers) which are used for data transmission from among all (physical) transmission antennas of the UE in uplink in SRS transmission symbols according to an arbitrary scheme among the multiplexing schemes suggested in the present invention or according to a different multiplexing scheme. This may prevent the occurrence of turn-on/off transition of power amplifiers and/or signal amplifiers at boundaries between data transmission symbols and SRS transmission symbols. In this SRS configuration scheme, it is possible to especially match SRS settings (configurations) in order to prevent the transition of power amplifiers and transmission antennas at transmission symbol boundaries in the case where a special configuration of a single antenna and power amplifier has been set, as when the UE includes 2 transmission power amplifiers for 4 (physical) transmission antennas, and in the case where transmission (physical) antennas of power amplifier output terminals are switched according to the special configuration.

In a situation in which channel sounding limited to partial ones of the (physical) transmission antennas (or layers or power amplifiers or signal amplifiers) of the UE is implemented, the UE performs channel sounding on all (or partial) antennas at regular intervals (or in a periodic manner) to allow the eNode B to measure channel changes of individual (physical) transmission antennas of the UE in order to allow the eNode B to select antennas or antenna groups from the transmission antennas (or layers or power amplifiers or signal amplifiers) of the UE. To accomplish this, it is possible to perform selection of antennas or antenna groups upon data transmission through UE-specific RRC signaling at regular intervals so as to perform channel sounding of an entire or partial system band of all (or partial) antennas during a duration sufficient for measurement at intervals of an appropriate period and to perform reconfiguration of detailed SRS transmission configurations suitable for the selection of antennas or antenna groups.

The example of FIG. 16 illustrated in association with the embodiment 5-1 may also be applied to perform channel sounding when antenna selection is applied according to this embodiment. In this case, it can be assumed that in the example of FIG. 16 that detailed SRS transmission configurations have been limited to (physical) transmission antennas that are in a turn-on state when specific transmission antennas are used in the case where antenna or antenna group selection for a series of data transmissions is applied. In this case, the UE may perform channel sounding by turning on/off the transmission antennas that have been set to a turn-off state in a periodic manner or an event-triggered manner. That is, when at least partial transmission antennas of the UE have been set to a turn-off state, the UE may perform channel sounding by temporarily turning the transmission antennas on at intervals of a specific period or according to a specific event while basically maintaining the turn-off state of the transmission antennas. For example, the UE may perform channel sounding of a partial or entire system band for all (physical) transmission antennas by turning on all (or partial) (physical) transmission antennas of the UE during a duration B at intervals of a duration A. To accomplish this, a turn-on precoder may be applied to an SRS transmission symbol during the duration B and a turn-off precoder may be applied to an SRS transmission symbol at a subsequent duration. The duration A corresponds to a channel sounding transmission period applied to the antennas that are in a turn-on state. Here, the duration A may be set to be longer than the channel sounding transmission period set for the antennas that are in a turn-on state. Specifically, the duration A may be set to a multiple of the channel sounding transmission period set for the antennas that are in a turn-on state. In the case where channel sounding through the duration B is performed in an event-triggered manner (for example, through L1/L2 control signaling), the duration A may not be separately defined/signaled.

In combination with this method, it is possible to apply a method of temporarily releasing the selection mode to allow all (physical) transmission antennas of the UE to be applied for transmission of data transmission symbols. It is also possible to prevent the occurrence of turn-on/off transition of power amplifiers and/or signal amplifiers at boundaries between data transmission symbols and SRS transmission symbols in a subframe by turning on all (or partial) (physical) transmission antennas through UE-specific RRC signaling, UE-specific L1/L2 control signaling or UE-specific UL grant PDCCH transmission by a cell or an eNode B in the case where an antenna turn-off state has been achieved through a power control mechanism. In this scheme, the durations A and B may be directly defined as a time and may also be set in units of subframes, each corresponding to, for example, 1 ms, or in units of radio frames, each corresponding to, for example, 10 ms.

In another scheme, in the case where the eNode B desires to perform measurement for checking whether or not channel states of all (physical) transmission antennas of the UE have changed in an event-triggered manner, the eNode B may make an instruction to perform channel sound of all (or partial) (physical) transmission antennas during a preset duration or an explicitly or implicitly signaled duration (for example, the duration B) through L1/L2 control signaling (for example, through a UL grant PDCCH, a power control PDCCH, or a dedicated PDCCH, or the like). In the case where channel sounding is performed during the duration B, each precoder for a data transmission symbol may be specified as a precoder other than an antenna turn-on/off precoder. This event-triggered signaling may also be specified as UE-specific RRC signaling. This event-triggered scheme may be implemented by specifying a precoder in a UI grant DCI format using a precoder of a data transmission symbol while being tied with reconfiguration of detailed SRS transmission configurations.

In this scheme, in the case where precoding is applied to an SRS and a precoder in a UL grant is specified not only using a precoder of a data transmission symbol but also using a precoder of an SRS transmission symbol, antenna turn-on/off of (physical) transmission antennas that transmit SRSs may be naturally implemented in a code book. Of course, the suggestions of this embodiment may also be applied in the case where an SRS is precoded.

A variety of information for channel sounding may be dynamically or non-dynamically signaled in the above embodiment 1-5 of the present invention. For example, in the present invention, information for channel sounding may be signaled in a UE-specific or a UE-group-specific manner through L1/L2 control signaling. More specifically, information for channel sounding may be transmitted from the eNode B (or relay) to the UE through a conventional PDCCH defined in the LTE system, a separately defined PDCCH, or through a control channel separately defined for signaling the information for channel sounding. In the case where the information for channel sounding is transmitted from the eNode B (or relay) to the UE through a separately defined PDCCH, an RNTI for an SRS may be defined or a DCI format may be separately defined. L1/L2 control signaling for an SRS may be performed at a preset time (for example, a period or offset) or may be performed in an event-triggered manner. In the case of a carrier aggregation system, L1/L2 control signal for channel sounding may be performed for each downlink component carrier set for the UE or may be performed only through a specific downlink component carrier (for example, through an anchor or primary DL component carrier). In this case, anchor or primary component carriers may be set one by one for each downlink component carrier group.

The information for channel sounding includes, but not limited to, information for newly configuring (or initiating) or releasing an SRS. For example, in the case where the eNode B has transmitted an L1/L2 control signaling signal (for example, a PDCCH) having a specific format/content (for example, a specific indicator) to the UE, the UE may start or release SRS transmission after a preset time has elapsed after the signaling is performed or after the UE has received the L1/L2 control signaling signal. The information for channel sounding may include configuration information (SRS transmission configuration information) required for SRS transmission (for example, an offset, a period, and the like). When the UE has newly received the SRS transmission configuration information through the L1/L2 control signaling, the UE may override (or overwrite) preset configuration information with the newly received SRS transmission configuration information. Alternatively, while maintaining the preset configuration information, the UE may perform channel sounding using the newly received SRS transmission configuration information only during a preset time or during a duration in which a preset condition is satisfied. The information transmitted through the SRS transmission configuration information may include entire or partial information required to perform channel sounding. The detailed content included in the SRS transmission configuration information may set in various manners depending on the type of signaling, the time of signaling, the cause of signaling, and the like. Specifically, the SRS transmission configuration information may include, but not limited to, at least part of the SRS configuration parameters of the LTE described above with reference to FIG. 5 and various parameters that are newly defined or are required to implement the embodiment 1-5.

Figure 17:
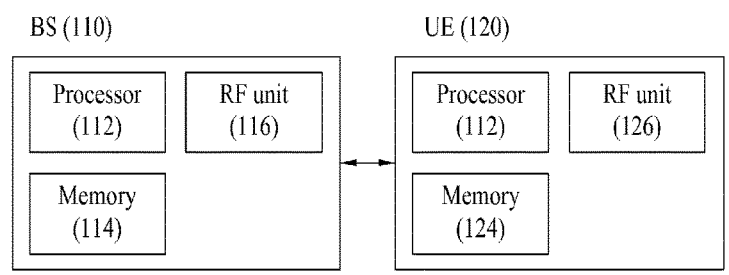
FIG. 17 is a block diagram illustrating a Base Station (BS) and a User Equipment (UE) according to an embodiment of the present invention.

FIG. 17 illustrates an eNode B and a UE to which the embodiments of the present invention may be applied.

As shown in FIG. 17, a wireless communication system includes a Base Station (BS) (or eNode B) 110 and a User Equipment (UE) 120. In downlink, a transmitter is a part of the BS 110 and a receiver is a part of the UE 120. In uplink, a transmitter is a part of the UE 120 and a receiver is a part of the BS 110. The BS 110 includes a processor 112, a memory 114, and a Radio Frequency (RF) unit 116. The processor 112 may be constructed so as to implement the procedures and/or methods suggested in the present invention. The memory 114 is connected to the processor 112 and stores various information associated with operations of the processor 112. The RF unit 116 is connected to the processor 112 and transmits or receives a wireless signal. The UE 120 includes a processor 122, a memory 124, and an RF unit 126. The processor 122 may be constructed so as to implement the procedures and/or methods suggested in the present invention. The memory 124 is connected to the processor 122 and stores various information associated with operations of the processor 122. The RF unit 126 is connected to the processor 122 and transmits or receives a wireless signal. The BS 110 and/or the UE 120 may include a single antenna or multiple antennas.

The above embodiments are provided by combining components and features of the present invention in specific forms. The components or features of the present invention should be considered optional unless explicitly stated otherwise. The components or features may be implemented without being combined with other components or features. The embodiments of the present invention may also be provided by combining some of the components and/or features. The order of the operations described above in the embodiments of the present invention may be changed. Some components or features of one embodiment may be included in another embodiment or may be replaced with corresponding components or features of another embodiment. It will be apparent that claims which are not explicitly dependent on each other can be combined to provide an embodiment or new claims can be added through amendment after this application is filed.

The embodiments of the present invention have been described focusing mainly on the data communication relationship between a UE (or terminal) and a Base Station (BS) (or eNode B). Specific operations which have been described as being performed by the BS may also be performed by an upper node as needed. That is, it will be apparent to those skilled in the art that the BS or any other network node may perform various operations for communication with terminals in a network including a number of network nodes including BSs. The term "base station (BS)" may be replaced with another term such as "fixed station", "Node B", "eNode B (eNB)", or "access point". The term "terminal" may also be replaced with another term such as "user equipment (UE)", "mobile station (MS)", or "mobile subscriber station (MSS)".

The embodiments of the present invention can be implemented by hardware, firmware, software, or any combination thereof. In the case where the present invention is implemented by hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In the case where the present invention is implemented by firmware or software, the embodiments of the present invention may be implemented in the form of modules, processes, functions, or the like which perform the features or operations described above. Software code can be stored in a memory unit so as to be executed by a processor. The memory unit may be located inside or outside the processor and can communicate data with the processor through a variety of known means.

Those skilled in the art will appreciate that the present invention may be embodied in other specific forms than those set forth herein without departing from the spirit of the present invention. The above description is therefore to be construed in all aspects as illustrative and not restrictive. The scope of the invention should be determined by reasonable interpretation of the appended claims and all changes coming within the equivalency range of the invention are intended to be embraced in the scope of the invention.

INDUSTRIAL APPLICABILITY

The present invention is applicable to a wireless communication system. Specifically, the present invention is applicable to a channel sounding method using a plurality of antennas and an apparatus for the same.

The invention claimed is:

1. A method for a user equipment (UE) to transmit sounding reference signals in a wireless communication system, the method comprising:
receiving higher layer information indicating a number N, wherein the number N is used for generating sounding reference sequences for multiple antenna ports of the UE;
mapping generated sounding reference sequences for the multiple antenna ports to resource elements on a symbol of a subframe, wherein each of the generated sounding reference sequences is corresponding to a respective one of the multiple antenna ports and defined using a base sequence number and a cyclic shift value; and
transmitting the mapped sounding reference sequences for the multiple antenna ports within the symbol of the subframe,
wherein one of cyclic shift values for the multiple antenna ports is specified using a signaled value, and N−1 remaining cyclic shift values for the multiple antenna ports are specified using N−1 offsets and the signaled value,
wherein some of the generated sounding reference sequences are mapped to a first set of every two resource elements and used for a first group of antenna ports among the multiple antenna ports, and the others of the generated sounding reference sequences are mapped to a second set of every two resource elements and used for a second group of antenna ports among the multiple antenna ports, the second set being different from the first set.

2. The method of claim 1, wherein the higher layer information includes a radio resource control (RRC) parameter or information.

3. The method of claim 1, wherein the number N is used to define a number of code resources for the sounding reference sequences for the multiple antenna ports of the UE.

4. The method of claim 1, wherein the signaled value is a cyclic shift value received via a radio resource control (RRC) signaling.

5. The method of claim 1, wherein transmission of the sounding reference sequences for the multiple antenna ports is triggered by Layer 1 (L1) control signal.

6. The method of claim 1, wherein the symbol is a last symbol of the subframe.

7. The method of claim 1, wherein the symbol is an orthogonal frequency division multiple access (OFDMA)-based symbol or a single carrier frequency division multiple access (SC-FDMA) symbol.

8. A method for a base station (BS) to process sounding reference signals in a wireless communication system, the method comprising:
transmitting higher layer information indicating a number N, wherein the number N is used for de-mapping sounding reference sequences for multiple antenna ports of a user equipment (UE);
receiving the sounding reference sequences for the multiple antenna ports of the UE on a symbol of a subframe, wherein each of the received sounding reference sequences is corresponding to a respective one of the multiple antenna ports and defined using a base sequence number and a cyclic shift value; and
de-mapping the received sounding reference sequences from resource elements of the symbol of the subframe,
wherein one of cyclic shift values for the multiple antenna ports is specified using a signaled value, and N−1 remaining cyclic shift values for the multiple antenna ports are specified using N−1 offsets and the signaled value,
wherein some of the received sounding reference sequences are de-mapped from a first set of every two resource elements and used for a first group of antenna ports among the multiple antenna ports, and the others of the received sounding reference sequences are de-mapped from a second set of every two resource elements and used for a second group of antenna ports among the multiple antenna ports, the second set being different from the first set.

9. The method of claim 8, wherein the higher layer information includes a radio resource control (RRC) parameter or information.

10. The method of claim 8, wherein the number N is used to define a number of code resources for the sounding reference sequences for the multiple antenna ports of the UE.

11. The method of claim 8, wherein the signaled value is a cyclic shift value received from a radio resource control (RRC) layer.

12. The method of claim 8, further comprising: transmitting Layer 1 (L1) control signal triggering transmission of the sounding reference sequences for the multiple antenna ports.

13. The method of claim 8, wherein the symbol is a last symbol of the subframe.

14. The method of claim 8, wherein the symbol is an orthogonal frequency division multiple access (OFDMA)-based symbol or a single carrier frequency division multiple access (SC-FDMA) symbol.

15. A user equipment (UE) used for a wireless communication system, the UE comprising:
   a memory;
   a radio frequency (RF) unit; and
   a processor electronically connected with the memory and the RF unit,
   wherein the processor is configured to:
   receive higher layer information indicating a number N, wherein the number N is used for generating sounding reference sequences for multiple antenna ports of the UE,
   map generated sounding reference sequences for the multiple antenna ports to resource elements on a symbol of a subframe, wherein each of the generated sounding reference sequences is corresponding to a respective one of the multiple antenna ports and defined using a base sequence number and a cyclic shift value, and
   transmit the mapped sounding reference sequences for the multiple antenna ports within the symbol of the subframe,
   wherein one of cyclic shift values for the multiple antenna ports is specified using a signaled value, and N−1 remaining cyclic shift values for the multiple antenna ports are specified using N−1 offsets and the signaled value,
   wherein some of the generated sounding reference sequences are mapped to a first set of every two resource elements and used for a first group of antenna ports among the multiple antenna ports, and the others of the generated sounding reference sequences are mapped to a second set of every two resource elements and used for a second group of antenna ports among the multiple antenna ports, the second set being different from the first set.

16. The UE of claim 15, wherein the higher layer information includes a radio resource control (RRC) parameter or information.

17. The UE of claim 15, wherein the number N is used to define a number of code resources for the sounding reference sequences for the multiple antenna ports of the UE.

18. The UE of claim 15, wherein the signaled value is a cyclic shift value received via a radio resource control (RRC) signaling.

19. The UE of claim 15, wherein transmission of the sounding reference sequences for the multiple antenna ports is triggered by Layer 1 (L1) control signal.

20. The UE of claim 15, wherein the symbol is a last symbol of the subframe.

21. The UE of claim 15, wherein the symbol is an orthogonal frequency division multiple access (OFDMA)-based symbol or a single carrier frequency division multiple access (SC-FDMA) symbol.

22. A base station (BS) used for a wireless communication system, the communication apparatus comprising:
   a memory;
   a radio frequency (RF) unit; and
   a processor electronically connected with the memory and the RF unit,
   wherein the processor is configured to:
   transmit higher layer information indication a number N, wherein the number N is used for de-mapping sounding reference sequences for multiple antenna ports of a user equipment (UE),
   receive the sounding reference sequences for the multiple antenna ports of the UE on a symbol of a subframe, wherein each of the received sounding reference sequences is corresponding to a respective one of the multiple antenna ports and defined using a base sequence number and a cyclic shift value, and
   de-map the received sounding reference sequences from resource elements of the symbol of the subframe,
   wherein one of cyclic shift values for the multiple antenna ports is specified using a signaled value, and N−1 remaining cyclic shift values for the multiple antenna ports are specified using N−1 offsets and the signaled value,
   wherein some of the received sounding reference sequences are de-mapped from a first set of every two resource elements and used for a first group of antenna ports among the multiple antenna ports, and the others of the received sounding reference sequences are de-mapped from a second set of every two resource elements and used for a second group of antenna ports among the multiple antenna ports, the second set being different from the first set.

23. The BS of claim 22, wherein the higher layer information includes a radio resource control (RRC) parameter or information.

24. The BS of claim 22, wherein the number N is used to define a number of code resources for the sounding reference sequences for the multiple antenna ports of the U E.

25. The BS of claim 22, wherein the signaled value is a cyclic shift value received from a radio resource control (RRC) layer.

26. The BS of claim 22, wherein the processor is further configured to: transmit Layer 1 (L1) control signal triggering transmission of the sounding reference sequences for the multiple antenna ports.

27. The BS of claim 22, wherein the symbol is a last symbol of the subframe.

28. The BS of claim 22, wherein the symbol is an orthogonal frequency division multiple access (OFDMA)-based symbol or a single carrier frequency division multiple access (SC-FDMA) symbol.

* * * * *

UNITED STATES PATENT AND TRADEMARK OFFICE
CERTIFICATE OF CORRECTION

PATENT NO. : 10,574,412 B2
APPLICATION NO. : 15/408283
DATED : February 25, 2020
INVENTOR(S) : Jae Hoon Chung et al.

Page 1 of 1

It is certified that error appears in the above-identified patent and that said Letters Patent is hereby corrected as shown below:

On the Title Page

Related U.S. Application Data
Item (63) delete "filed on January 6, 2016, now abandoned" and insert -- filed on December 31, 2015, now Pat. No. 9,577,805 --

Signed and Sealed this
Twelfth Day of May, 2020

Andrei Iancu
*Director of the United States Patent and Trademark Office*